United States Patent
Sasaki

(10) Patent No.: US 9,059,997 B2
(45) Date of Patent: Jun. 16, 2015

(54) CLIENT DEVICE, SERVER APPARATUS, CONTENT OBTAINMENT METHOD, AND INTEGRATED CIRCUIT

(75) Inventor: Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 271 days.

(21) Appl. No.: 13/703,802

(22) PCT Filed: Apr. 19, 2012

(86) PCT No.: PCT/JP2012/002710
§ 371 (c)(1),
(2), (4) Date: Dec. 12, 2012

(87) PCT Pub. No.: WO2012/144214
PCT Pub. Date: Oct. 26, 2012

(65) Prior Publication Data
US 2013/0091253 A1    Apr. 11, 2013

(30) Foreign Application Priority Data

Apr. 20, 2011 (JP) ................................. 2011-094483

(51) Int. Cl.
| | |
|---|---|
| G06F 15/16 | (2006.01) |
| H04L 29/08 | (2006.01) |
| H04L 29/06 | (2006.01) |
| G06F 7/00 | (2006.01) |
| G06F 17/00 | (2006.01) |

(52) U.S. Cl.
CPC ............ *H04L 67/1002* (2013.01); *H04L 65/00* (2013.01); *H04L 29/06* (2013.01)

(58) Field of Classification Search
CPC . H04L 67/1002; H04L 67/1097; H04L 29/06; G06F 11/1446; G06F 11/1469
See application file for complete search history.

(56) References Cited

U.S. PATENT DOCUMENTS

| | | | |
|---|---|---|---|
| 7,328,402 B1 | 2/2008 | Yamagishi et al. | |
| 7,979,391 B2 * | 7/2011 | Watanabe et al. | 707/620 |
| 2002/0147733 A1 * | 10/2002 | Gold et al. | 707/200 |
| 2003/0056139 A1 * | 3/2003 | Murray et al. | 714/4 |
| 2004/0054700 A1 * | 3/2004 | Okada | 707/204 |
| 2005/0216788 A1 * | 9/2005 | Mani-Meitav et al. | 714/6 |
| 2008/0091687 A1 | 4/2008 | Watanabe et al. | |
| 2010/0274765 A1 * | 10/2010 | Murphy et al. | 707/652 |

FOREIGN PATENT DOCUMENTS

| | | |
|---|---|---|
| JP | 2001-14205 | 1/2001 |
| JP | 2001-184355 | 7/2001 |
| JP | 3490641 | 1/2004 |
| JP | 2007-299266 | 11/2007 |
| JP | 2008-263642 | 10/2008 |
| JP | 4551951 | 9/2010 |
| WO | 2006/090612 | 8/2006 |

OTHER PUBLICATIONS

International Search Report issued May 22, 2012 in International (PCT) Application No. PCT/JP2012/002710.

* cited by examiner

*Primary Examiner* — Wen-Tai Lin
(74) *Attorney, Agent, or Firm* — Wenderoth, Lind & Ponack, L.L.P.

(57) ABSTRACT

A client device manages one type of content list for a plurality of content obtainment servers, and updates information included in the content list based on information received from each content obtainment server. Thus, the client device can provide the content list with less unnecessary information to each home server with a lighter processing load, so that the time for the home server to obtain contents from the client device can be reduced.

19 Claims, 16 Drawing Sheets

FIG. 4

Obtained content table 400

| Client ID | Content ID | File path | Difference number |
|---|---|---|---|
| CLIENT01 | IMG01 | /Data/IMG01.jpg | 1 |
| CLIENT01 | IMG02 | /Data/IMG02.jpg | 2 |
| CLIENT01 | IMG03 | /Data/IMG03.jpg | 3 |
| CLIENT01 | IMG04 | /Data/IMG04.jpg | 4 |
| CLIENT01 | IMG05 | /Data/IMG05.jpg | 5 |
| CLIENT01 | IMG06 | /Data/IMG06.jpg | 6 |
| CLIENT01 | IMG07 | /Data/IMG07.jpg | 7 |
| CLIENT01 | IMG08 | /Data/IMG08.jpg | 8 |
| CLIENT02 | IMG0A | /Data/IMG0A.jpg | 1 |

FIG. 5

Obtained maximum difference number management table 450

| Client ID | Maximum difference number |
|---|---|
| CLIENT01 | 8 |
| CLIENT02 | 1 |

| Content ID | Reference ID | Type | Child count | Resource path | Difference number | Difference state |
|---|---|---|---|---|---|---|
| IMG-LIST01 | -1 | Image list | 30 | http://10.0.0.2/IMG-LIST01 | -1 | -1 |
| AUD-LIST01 | -1 | Music list | 0 | http://10.0.0.2/AUD-LIST01 | -1 | -1 |
| DIFF-ROOT | -1 | Difference root list | 3 | http://10.0.0.2/DIFF-LIST01 | 30 | -1 |

Root list (ROOT-LIST) 500

| Content ID | Reference ID | Type | Child count | Resource path | Difference number | Difference state |
|---|---|---|---|---|---|---|
| IMG01 | -1 | Image | -1 | http://10.0.0.2/IMG01.jpg | -1 | -1 |
| IMG02 | -1 | Image | -1 | http://10.0.0.2/IMG02.jpg | -1 | -1 |
| ... | ... | ... | ... | ... | ... | ... |
| IMG29 | -1 | Image | -1 | http://10.0.0.2/IMG29.jpg | -1 | -1 |
| IMG30 | -1 | Image | -1 | http://10.0.0.2/IMG30.jpg | -1 | -1 |

Image list (IMG-LIST01) 501

| Content ID | Reference ID | Type | Child count | Resource path | Difference number | Difference state |
|---|---|---|---|---|---|---|
| DIFF-LIST01 | -1 | Partial difference list | 2 | http://10.0.0.2/DIFF-LIST01 | 10 | -1 |
| DIFF-LIST02 | -1 | Partial difference list | 10 | http://10.0.0.2/DIFF-LIST02 | 20 | -1 |
| DIFF-LIST03 | -1 | Partial difference list | 10 | http://10.0.0.2/DIFF-LIST03 | 30 | -1 |

Difference root list (DIFF-ROOT) 502

| Content ID | Reference ID | Type |
|---|---|---|
| REF-IMG09 | IMG09 | Difference |
| REF-IMG10 | IMG10 | Difference |

Partial difference list (DIFF-LIST01) 503

| Child count | Resource path | Difference number | Difference state |
|---|---|---|---|
| -1 | http://10.0.0.2/REF-IMG09 | 9 | Add |
| -1 | http://10.0.0.2/REF-IMG10 | 10 | Update |

FIG. 11

Content table 1000 / 300

| Content ID | Reference ID | Type | Parent list | Child count | File path | Difference number | Difference state |
|---|---|---|---|---|---|---|---|
| ROOT | -1 | Root list | -1 | 3 | -1 | -1 | -1 |
| IMG-LIST01 | -1 | Image list | ROOT | 30 | -1 | -1 | -1 |
| AUD-LIST01 | -1 | Music list | ROOT | 0 | -1 | -1 | -1 |
| DIFF-ROOT | -1 | Difference root list | ROOT | 3 | -1 | 30 | -1 |
| IMG01 | -1 | Image | IMG-LIST01 | -1 | /Data/IMG01.jpg | -1 | -1 |
| IMG02 | -1 | Image | IMG-LIST01 | -1 | /Data/IMG02.jpg | -1 | -1 |
| ... | ... | ... | ... | ... | ... | ... | ... |
| IMG29 | -1 | Image | IMG-LIST01 | -1 | /Data/IMG29.jpg | -1 | -1 |
| IMG30 | -1 | Image | IMG-LIST01 | -1 | /Data/IMG30.jpg | -1 | -1 |
| DIFF-LIST01 | -1 | Partial difference list | DIFF-ROOT | 2 | -1 | 10 | -1 |
| DIFF-LIST02 | -1 | Partial difference list | DIFF-ROOT | 10 | -1 | 20 | -1 |
| DIFF-LIST03 | -1 | Partial difference list | DIFF-ROOT | 10 | -1 | 30 | -1 |
| REF-IMG09 | IMG09 | Difference | DIFF-LIST01 | -1 | /Data/IMG09.jpg | 9 | Add |
| REF-IMG10 | IMG10 | Difference | DIFF-LIST01 | -1 | /Data/IMG10.jpg | 10 | Update |
| ... | ... | ... | ... | ... | ... | ... | ... |
| REF-IMG29 | IMG29 | Difference | DIFF-LIST03 | -1 | /Data/IMG29.jpg | 29 | Add |
| REF-IMG30 | IMG30 | Difference | DIFF-LIST03 | -1 | /Data/IMG30.jpg | 30 | Add |

Server management table 1100

| Server ID | Obtained latest difference number |
|---|---|
| SERVER01 | 8 |
| SERVER02 | 20 |
| SERVER03 | -1 |

Difference number management table 1200

| Latest difference number |
|---|
| 30 |

CLIENT DEVICE, SERVER APPARATUS, CONTENT OBTAINMENT METHOD, AND INTEGRATED CIRCUIT

TECHNICAL FIELD

The present invention relates to a client device that is included in a content obtainment system together with a server apparatus and stores a plurality of contents which are obtained by the server apparatus.

BACKGROUND ART

A content obtainment system in which one or more server apparatuses obtain a plurality of contents stored in a client device is conventionally available (see Patent Literatures (PTL) 1 to 4).

CITATION LIST

Patent Literature

[PTL 1]
Japanese Patent No. 3490641
[PTL 2]
Japanese Unexamined Patent Application Publication No. 2001-184355
[PTL 3]
Japanese Patent. No. 4551951
[PTL 4]
Japanese Unexamined Patent Application Publication No. 2007-299266

SUMMARY OF INVENTION

Technical Problem

However, there are cases where a heavy processing load is placed on the client device.

In view of this, the present invention has an object of providing a client device, a server apparatus, and a content obtainment method that can achieve a reduction in processing load.

Solution to Problem

To achieve the object stated above, a client device according to an aspect of the present invention is a client device in a content obtainment system in which one or more server apparatuses obtain a plurality of contents stored in the client device, the client device including: a storage unit that stores the plurality of contents; a content management unit that causes the one or more server apparatuses to obtain the stored contents; a difference information management unit that generates difference information as information common to the one or more server apparatuses, and provides the difference information in response to a request of each of the one or more server apparatuses, the difference information including content information about a content not obtained by all of the one or more server apparatuses from the client device from among the stored contents; and an obtained content management unit that receives, from each of the one or more server apparatuses, obtained content information which is content information about a content obtained by the server apparatus, wherein the difference information management unit deletes, from the difference information, content information about a content obtained by all of the one or more server apparatuses, based on the received obtained content information.

The general or specific aspect may be implemented using a system, a method, an integrated circuit, a computer program, or a recording medium, or any combination of systems, methods, integrated circuits, computer programs, and recording media.

Advantageous Effects of Invention

A client device according to the present invention can achieve a reduction in processing load.

BRIEF DESCRIPTION OF DRAWINGS

FIG. 4 is a diagram showing a data structure of an obtained content table in the embodiment of the present invention.

FIG. 5 is a diagram showing a data structure of an obtained maximum difference number management table in the embodiment of the present invention.

FIG. 7 is a diagram showing a data structure of a root list in the embodiment of the present invention.

FIG. 8 is a diagram showing a data structure of an image list in the embodiment of the present invention.

FIG. 9 is a diagram showing a data structure of a difference root list in the embodiment of the present invention.

FIG. 10 is a diagram showing a data structure of a partial difference list in the embodiment of the present invention.

FIG. 11 is a diagram showing a data structure of a content table in the embodiment of the present invention.

FIG. 12 is a diagram showing a data structure of a server management table in the embodiment of the present invention.

FIG. 13 is a diagram showing a data structure of a difference number management table in the embodiment of the present invention.

Figure 1:
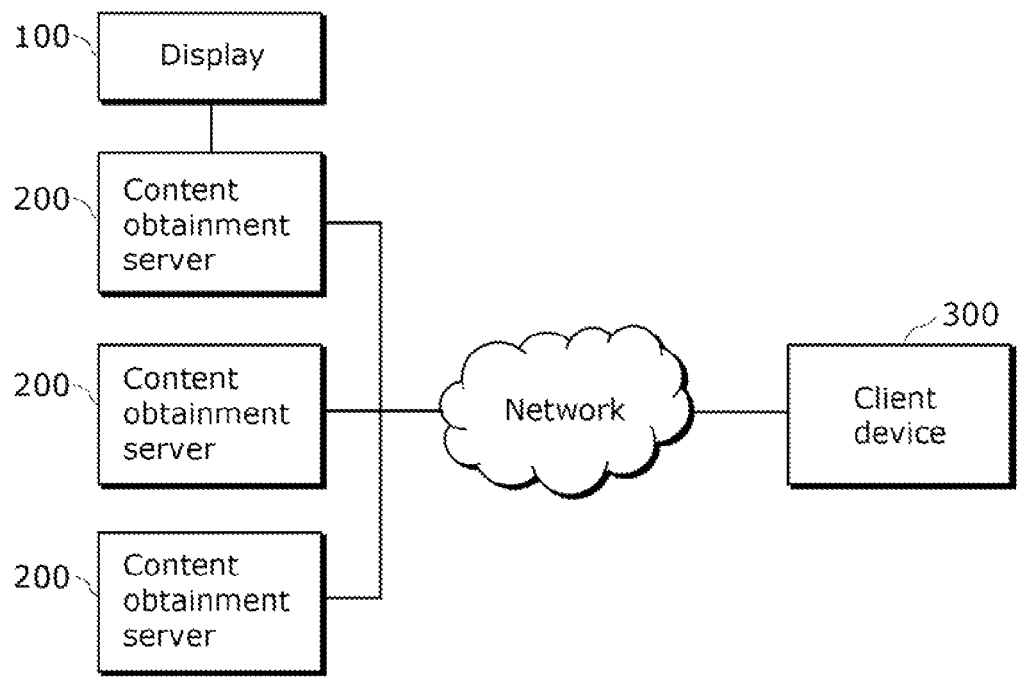
FIG. 1 is a diagram showing an overall structure of a content obtainment system in an embodiment of the present invention.

DESCRIPTION OF EMBODIMENTS (Underlying Knowledge Forming Basis of the Present Invention)

First, underlying knowledge forming the basis of the present invention is described below. Consider a situation where contents are stored in each of various devices such as a personal computer (PC), a digital camera, a video camera, and the like. To eliminate inconvenience of managing these contents, there is a home server product that obtains the contents from the devices and manages the contents in a centralized manner. In this description, a device from which a home server obtains contents is referred to as a client device.

Various products such as a PC, a recorder, and the like have such a home server function. Accordingly, in many cases a plurality of home servers obtain contents stored in a client device. Each individual may distinguish a plurality of home servers into, for example, a home server shared by all members of the family and a home server used by the individual. This is a typical example where a plurality of home servers obtain contents stored in a client device.

Here, content transfer from a client device to a home server is performed via a network such as an Ethernet (registered trademark) cable, a wireless LAN (Local Area Network), or the like. Content transfer from a client device to a home server may instead be performed via a communication cable such as a USB (Universal Serial Bus) cable or the like.

As a method whereby a home server obtains contents from a client device, the following method is conventionally available. A content list including information about all contents stored in a client device is used in this method (for example, see PTL 1 and PTL 2). The content list including information about all contents stored in the client device is hereafter referred to as a "full content list". In the method using the full content list, a home server obtains the full content list from the client device, and compares the obtained full content list with a list of contents obtained by the home server. By doing so, the home server specifies any content that is included in the obtained full content list but is not included in the list of obtained contents, as a content not obtained by the home server (i.e. unobtained content). The home server then obtains only the specified unobtained content from the client device.

As another method whereby a home server obtains contents from a client device, there is a method in which a client device generates an unobtained content list for each of a plurality of home servers (for example, see PTL 3 and PTL 4). The content list generated by the client device for each home server is hereafter referred to as an "individual content list". In the method using the individual content list, the client device exercises the following management. The client device manages, in association with each stored content, information indicating whether or not the content has already been transferred to each home server. At a timing requested by a home server or at a predetermined timing, the client device generates an individual content list corresponding to the home server, and notifies the home server of the generated individual content list. The home server specifies any unobtained content based on the individual content list notified from the client device, and obtains the specified unobtained content.

However, the full content list includes not only information about contents not obtained by the home server from the client device, but also information about obtained contents. Such information about obtained contents is unnecessary to the home server. For the purpose of obtaining contents from client devices and managing the contents in a centralized manner, the home server only needs to obtain the information about contents not obtained from the client device.

That is, in the method using the full content list as a method whereby a home server obtains contents from a client device, a lot of unnecessary information are included in the content list obtained by the home server. The method therefore has a problem such as a prolonged time to obtain the content list and a prolonged time to specify any unobtained content from the obtained content list. In the case where the client device does not store any content not obtained by the home server, all information included in the full content list are unnecessary to the home server, which is particularly wasteful.

In the method using the individual content list as a method whereby a home server obtains contents from a client device, the client device manages, in association with each content stored in the client device, information indicating whether or not the content has been transferred to each home server. This requires the client device to generate the individual content list for each home server. The method therefore has a problem of a heavy processing load on the client device. In particular, the processing load is heavier when there are a larger number of home servers for each of which the individual content list is to be generated. The client device such as a digital camera, a video camera, or the like usually has low processing capacity, and is often limited in the number of home servers for each of which the individual content list can be generated. Besides, a heavier processing load of individual content list generation has a higher possibility of affecting normal imaging operations and the like.

To solve these conventional problems, the present technique provides a content obtainment method and a content obtainment system that can reduce a processing load on a client device as compared with the method using the individual content list and reduce unnecessary information in a content list as compared with the method using the full content list.

To solve the problems stated above, a client device according to an aspect of the present invention is a client device in a content obtainment system in which one or more server apparatuses obtain a plurality of contents stored in the client device, the client device including: a storage unit that stores the plurality of contents; a content management unit that causes the one or more server apparatuses to obtain the stored contents; a difference information management unit that generates difference information as information common to the one or more server apparatuses, and provides the difference information in response to a request of each of the one or more server apparatuses, the difference information including content information about a content not obtained by all of the one or more server apparatuses from the client device from among the stored contents; and an obtained content management unit that receives, from each of the one or more server apparatuses, obtained content information which is content information about a content obtained by the server apparatus, wherein the difference information management unit deletes, from the difference information, content information about a content obtained by all of the one or more server apparatuses, based on the received obtained content information.

According to this structure, the difference information managed by the client device is generated as the information common to the one or more server apparatuses. This can reduce the processing load on the client device, as compared with the above-mentioned method of providing the individual difference list to each of the one or more server apparatuses.

In addition, based on the obtained content information received from each of the one or more server apparatuses, the content information about each content obtained by all of the one or more server apparatuses is deleted from the difference information. The difference information is information indicating each content not obtained by all of the one or more server apparatuses, and so the above-mentioned content information need not be included in the difference information. The unnecessary content information is thus deleted, as a result of which the difference information can be kept to a minimum necessary size. This can reduce the time for the server apparatus to obtain the difference information and the time for the server apparatus to specify any unobtained content from the difference information.

Moreover, the client device may further include a server management unit that stores one or more server identifiers for identifying the one or more server apparatuses, wherein the difference information management unit, in the case where a new content is added to the contents stored in the storage unit or a content stored in the storage unit is updated or deleted, includes content information about the added, updated, or deleted content in the difference information as new content information, the obtained content management unit receives, from the server apparatus, a server identifier of the server apparatus and the obtained content information, and records the received server identifier and obtained content information in association with each other, and the difference information management unit deletes, from the difference information, content information indicated by obtained content information associated with all server identifiers stored in the server management unit from among all obtained content information recorded by the obtained content management unit.

According to this structure, in the case where an obtained content is updated or deleted in the client device, the server apparatus performs the same content obtainment process as in the case where a new content is added. This enables the server apparatus to apply the same process such as update or deletion to the obtained content as in the client device.

Moreover, the difference information management unit may, in the case where the new content is added to the client device or the stored content is updated or deleted, include the content information about the added, updated, or deleted content in the difference information, and then notify all server apparatuses whose server identifiers are stored in the server management unit that the difference information is updated.

According to this structure, the server apparatus can be informed that the difference information is updated. This makes it unnecessary for the server apparatus to inquire of the client device whether or not the difference information is updated.

Moreover, the difference information management unit may, after including the content information about the added, updated, or deleted content in the difference information, further notify all server apparatuses whose server identifiers are stored in the server management unit of a total number of sets of content information included in the difference information.

According to this structure, the server apparatus can be informed of the total number of sets of information included in the difference information. This enables the server apparatus to estimate the time to obtain the difference information beforehand, and also present information of the time estimated beforehand to the user.

Moreover, the difference information management unit may: manage a difference number indicating, by a magnitude relation thereof, time series of state change including content addition, update, or deletion, in association with content information about a content not obtained by all of the one or more server apparatuses from the client device; and, each time the state change that the new content is added to the client device or the stored content is updated or deleted occurs, increase the difference number and associate the increased difference number with the content information about the content having the state change, wherein the obtained content management unit receives, from the server apparatus, the server identifier and a maximum difference number out of all difference numbers associated with the obtained content information, the server management unit manages a server management table in which the received server identifier and maximum difference number are associated with each other, and the difference information management unit selects a minimum difference number out of difference numbers associated with all server identifiers stored in the server management unit, and deletes, from the difference information, content information associated with a difference number equal to or less than the minimum difference number.

According to this structure, the difference number indicating, by its magnitude relation, the time series of state change including content addition, update, or deletion is associated with each content. The content change order can thus be managed. Therefore, the client device does not need to obtain information about all obtained contents from the server apparatus. That is, the client device can recognize all contents obtained by the server apparatus, simply by obtaining the maximum difference number out of the difference numbers associated with the obtained content information. This can reduce the amount of information notified from the server apparatus to the client device, and also the processing load on both the server apparatus and the client device.

In addition, since the information about each content obtained by all managed server apparatuses is no longer necessary to any server apparatus, the client device deletes such information from the difference information, thereby keeping unnecessary information from being included in the difference information. This can reduce the time for the server apparatus to obtain the difference information and the time for the server apparatus to specify any unobtained content from the difference information. In the process of deleting the unnecessary information from the difference information, the client device uses the difference number. Hence, the information to be deleted from the difference information can be determined simply based on the difference number magnitude relation, without closely examining the information to be deleted. This can reduce the processing load on the client device.

Moreover, the difference information management unit may, after including the content information about the content having the state change in the difference information, notify all server apparatuses whose server identifiers are stored in the server management unit of a maximum difference number out of all difference numbers included in the difference information.

According to this structure, the server apparatus can be informed that the difference information is updated. This makes it unnecessary for the server apparatus to inquire of the client device whether or not the difference information is updated. The server apparatus compares the difference number associated with the content obtained from the client device, with the difference number notified from the client device. Through this comparison, the server apparatus can determine whether or not any unobtained content is stored in the client device. The server apparatus obtains the difference information from the client device only in the case where any unobtained content is stored in the client device. Thus, the server apparatus can be kept from obtaining the difference information from the client device in the case where no unobtained content is stored in the client device.

Moreover, the difference information management unit may, after including the content information about the content having the state change in the difference information, notify all server apparatuses whose server identifiers are stored in the server management unit of a minimum difference number out of all difference numbers included in the difference information.

According to this structure, the server apparatus is notified of the maximum difference number and the minimum difference number in the difference information, from the client device. From the notified numbers, the server apparatus can estimate the total number of sets of content information included in the difference information, by a predetermined operation based on difference number definition (for example, the total number can be calculated by adding 1 to the result of subtracting the minimum difference number from the maximum difference number). The server apparatus can then estimate, from the estimated total number, the time to obtain the difference information beforehand, and also present information of the time estimated beforehand to the user.

Moreover, the difference information management unit may: (1) include the content information associated with the difference number in first difference information, and include, in second difference information in a higher hierarchical level than the first difference information, a maximum difference number out of all difference numbers included in the first difference information and information about the first difference information in association with each other; (2) in the case where the number of sets of content information included in the first difference information reaches a predetermined number, newly generate third difference information in the same hierarchical level as the first difference information, include, in the third difference information, the content information which causes the predetermined number to be exceeded in the case of being included in the first difference information, and include, in the second difference information, a maximum difference number out of all difference numbers included in the third difference information and information about the third difference information in association with each other; and provide the first difference information or provide the second difference information and at least one of the first difference information and the third difference information, in response to a request of the server apparatus.

According to this structure, the client device divides the difference information into a plurality of sets of difference information having a hierarchical structure, and associates each set of difference information with a difference number included in the difference information. Hence, even in the case where information unnecessary to a given server apparatus is included in the difference information, the server apparatus is able to obtain only the necessary information in the difference information. That is, the server apparatus does not need to obtain any unnecessary part of the difference information from the client device. This can reduce the processing time of the server apparatus.

Moreover, the difference information management unit may include the content information in the difference information, only in the case where a server identifier of any of the one or more server apparatuses is stored in the server management unit.

According to this structure, the client device does not generate the difference information in the case where there is no server apparatus that needs the difference information. This can reduce the processing load on the client device.

Moreover, the server management unit may delete a designated server identifier out of the stored server identifiers, wherein the difference information management unit deletes all content information included in the difference information and the difference information, in the case where no server identifier is stored in the server management unit.

According to this structure, since no server apparatus needs the difference information in the case where no server identifier is stored in the server management unit, the unnecessary difference information and the information included in the difference information are deleted in such a case. This can reduce the storage area consumption of the client device.

Moreover, the server management unit may receive a server registration request including the server identifier from the server apparatus, and store the received server identifier.

According to this structure, the server identifier is received from the server apparatus, so that the user is saved from a troublesome task such as setting the server identifier in the client device.

Moreover, the client device may further include a device information provision unit that provides client device information including information about the client device to the server apparatus, the information about the client device including a client identifier of the client device, wherein the device information provision unit includes information for obtaining the difference information, in the client device information.

According to this structure, the server apparatus can directly obtain the difference information simply by obtaining the client device information.

A server apparatus according to an aspect of the present invention is a server apparatus in a content obtainment system in which one or more server apparatuses obtain a plurality of contents stored in a client device, the server apparatus including: a difference information obtainment unit that obtains difference information from the client device, the difference information including content information about a content stored in the client device and not obtained by all of the one or more server apparatuses from the client device; a content obtainment unit that obtains only an unobtained content from the client device, based on the content information included in the difference information; and an obtained content management unit that records content information about the content obtained by the content obtainment unit, wherein the difference information includes the content information on a content-by-content basis, in association with a difference number indicating, by a magnitude relation thereof, time series of state change including content addition, update, or deletion, the obtained content management unit records a maximum difference number out of all difference numbers associated with the content information about the content obtained by the content obtainment unit, as a first difference number, the content obtainment unit obtains, from the client device, only a content corresponding to content information associated with a difference number greater than the first difference number in the difference information, and the server apparatus further includes an obtained content notification unit that notifies the client device of a server identifier and the first difference number, the server identifier being an identifier of the server apparatus.

According to this structure, the content information included in the difference information is managed in association with the difference number. The server apparatus can thus obtain the content information about any unobtained content from the difference information, simply by comparing difference number magnitudes. In addition, the server apparatus can notify the client device of the content information about all obtained contents, simply by sending one maximum difference number out of the difference numbers associated with the obtained content information to the client device. The client device can then delete the unnecessary information from the difference information based on the notified difference number.

Moreover, the server apparatus may further include a difference number reception unit that receives a latest difference number from the client device, wherein the difference information obtainment unit compares the latest difference number received by the difference number reception unit with the first difference number, and obtains the difference information from the client device only in the case where the latest difference number received by the difference number reception unit is greater than the first difference number.

According to this structure, the server apparatus obtains the difference information based on the difference number received from the client device. This makes it unnecessary for the server apparatus to constantly inquire of the client device whether or not the difference information is updated. Besides, by comparing the difference number received from the client device with the first difference number, the server apparatus can determine whether or not any unobtained content is stored in the client device. Thus, the server apparatus can be kept from obtaining the unnecessary difference information from the client device in the case where no unobtained content is stored in the client device.

Moreover, the difference information obtainment unit may, in the case where first difference information obtained from the client device includes information about second difference information in a lower hierarchical level than the first difference information: obtain a difference number associated with content information included in the second difference information, from the information about the second difference information; compare the obtained difference number with the first difference number; and obtain the second difference information only in the case where the difference number associated with the content information included in the second difference information is greater than the first difference number.

According to this structure, in the case where the difference information is divided into a plurality of sets of difference information, the server apparatus is able to obtain only the information about each unobtained content, without obtaining all difference information. This can reduce the time for the server apparatus to obtain the difference information from the client device.

Moreover, the server apparatus may further include a device information obtainment unit that obtains client device information including a client identifier, the client device information including information for obtaining the difference information from the client device, wherein the difference information obtainment unit obtains the difference information based on the information included in the client device information.

According to this structure, the server apparatus can directly obtain the difference information from the client device simply by obtaining the client device information.

Note that the present invention may be realized not only as an apparatus or a device, but also as an integrated circuit including the processing units included in the apparatus or the device, a method including steps corresponding to the processing units included in the apparatus or the device, a program causing a computer to execute these steps, or information, data, or a signal indicating the program. The program, information, data, or signal may be distributed via a recording medium such as a CD-ROM or a communication medium such as the Internet.

According to the technique described above, a client device only needs to manage one type of content list common to a plurality of home servers. The client device receives, from each home server, information about a content obtained by the home server from the client device, and deletes information about each content obtained by all home servers from the content list. Unnecessary information in the content list can thus be reduced. Therefore, the client device can generate the content list with a lighter processing load than in the method using the individual content list. Furthermore, the home server can obtain the content list with less unnecessary information from the client device than in the method using the full content list. This can reduce the time to obtain the content list from the client device and the time to specify any unobtained content from the content list.

These general or specific aspects may be implemented using a system, a method, an integrated circuit, a computer program, or a recording medium, or any combination of systems, methods, integrated circuits, computer programs, or recording media.

The following describes an embodiment of the present invention with reference to drawings. In the drawings, the same components are given the same reference signs.

This embodiment describes a content obtainment system in which a plurality of home servers obtain, from one client device, contents (hereafter referred to as "obtainment target contents") stored in the client device. Specific examples of the client device include a digital camera, a video camera, and the like, though the client device is not limited to such. The obtainment target contents are not limited to a particular type, and may be of any type such as images, moving images, audio, texts, and so on.

FIG. 1 is a diagram showing an overall structure of the content obtainment system in this embodiment.

As shown in FIG. 1, a plurality of content obtainment servers 200 each obtain contents from a client device 300 via a network. Each content obtainment server 200 can be provided with a display 100, and display a content obtained from the client device 300 or display notification information to the user. The network may be a wired or wireless network, a communication cable, or the like. In this embodiment, a network connected by a wireless LAN is used.

Figure 6:
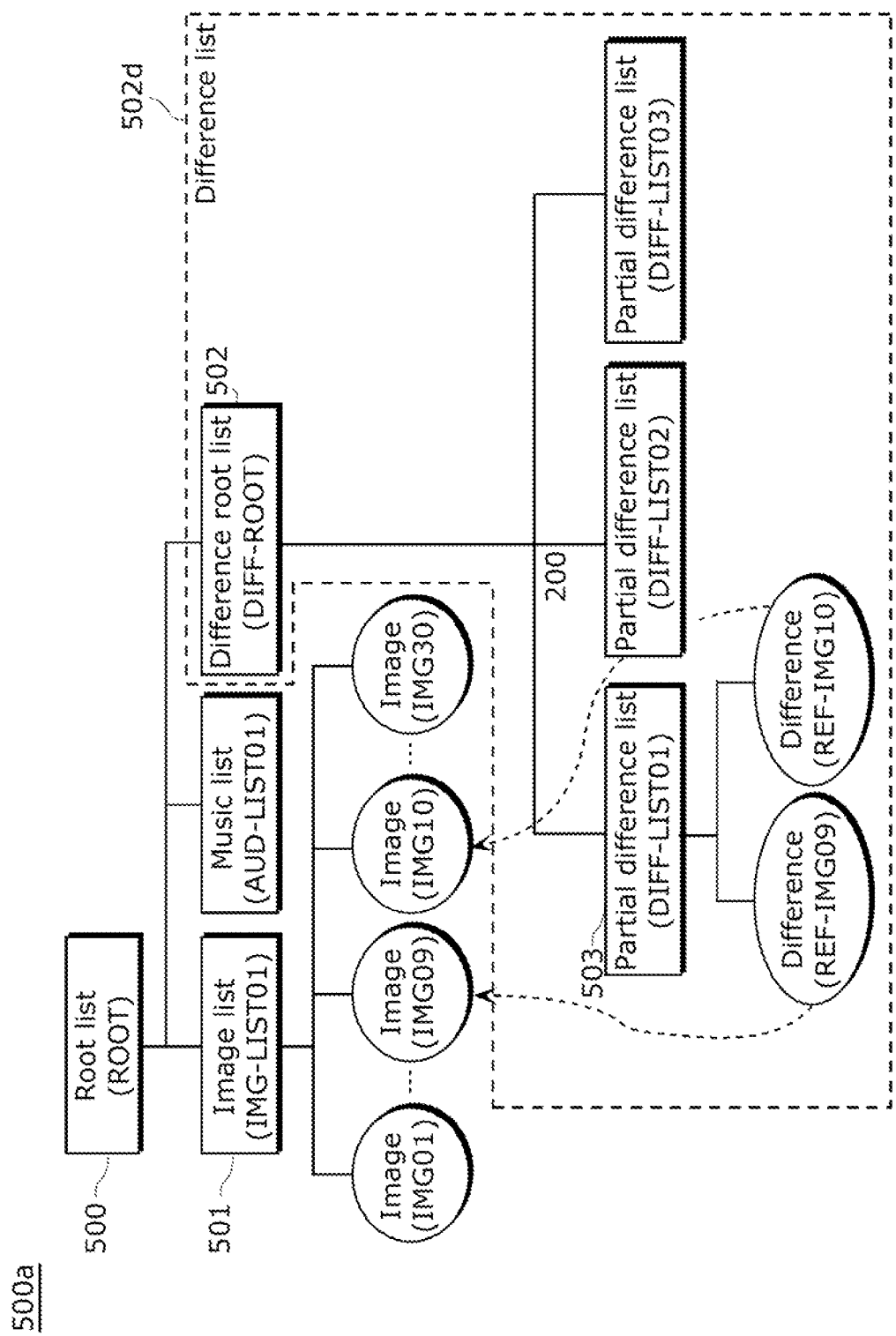
FIG. 6 is a diagram showing a hierarchical structure of a content list in the embodiment of the present invention.

In the content obtainment system in this embodiment, the client device 300 causes the content obtainment server 200 connected via the network to obtain a difference list (see a difference list 502d in FIG. 6). This is performed in order for the content obtainment server 200 to specify any unobtained content in the client device 300. The difference list mentioned here is a list common to all content obtainment servers 200. The present technique is characterized by the generation and obtainment of such a difference list. The difference list is a list in which content information of each content not obtained by all content obtainment servers 200 yet is recorded. Accordingly, content information of each content obtained by all content obtainment servers 200 is deleted from the difference list.

Figure 2:
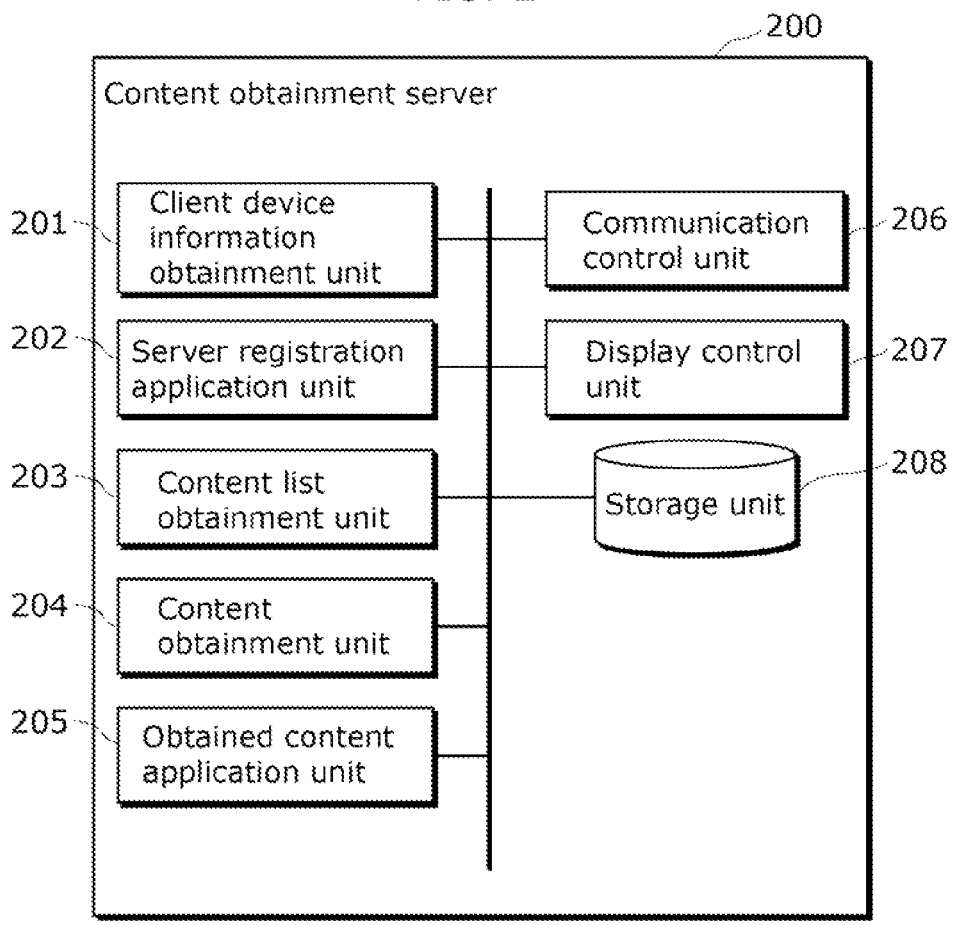
FIG. 2 is a block diagram showing a main structure of a content obtainment server in the embodiment of the present invention.

FIG. 2 is a block diagram showing a structure of the content obtainment server 200 (FIG. 1).

As shown in FIG. 2, the content obtainment server 200 includes a client device information obtainment unit 201, a server registration application unit 202, a content list obtainment unit 203, a content obtainment unit 204, an obtained content application unit 205, a communication control unit 206, a display control unit 207, and a storage unit 208.

The client device information obtainment unit 201 obtains client device information from the client device 300. The client device information includes information about the client device 300. The information about the client device 300 is, for example, a client ID which is an identifier unique to the client device 300, information of functions provided by the client device 300, and the like.

The server registration application unit 202 sends a server registration request to the client device 300, to apply for registration of the content obtainment server 200 to the client device 300. The sent server registration request includes a server ID of the content obtainment server 200.

Upon receiving the server registration request, the client device 300 (FIG. 1) registers the server ID of the content obtainment server 200 sending the server registration request, which is included in the server registration request, in the client device 300. The client device 300 then notifies the content obtainment server 200 sending the server registration request of the registration result.

The server registration application unit 202 also records, in a registration-complete client list not shown, the client ID of the client device 300 which has completed the registration, based on the registration result received from the client device 300. The server registration application unit 202 stores and manages the registration-complete client list in the storage unit 208.

Note that the server ID is recorded in the storage unit 208 upon factory shipment or initialization of the content obtainment server 200.

FIG. 4 is a diagram showing an obtained content table 400.

The content list obtainment unit 203 obtains a content list from the client device 300. The content list obtainment unit 203 compares the obtained content list with the obtained content table 400 shown in FIG. 4, and specifies any unobtained content. A specific example of the above-mentioned content list obtained by the content list obtainment unit 203 will be described in detail later with reference to FIGS. 6 to 10.

The content obtainment unit 204 obtains the unobtained content, i.e. the content not obtained by the content obtainment server 200 yet, which is specified by the content list obtainment unit 203. The content obtainment unit 204 obtains the unobtained content from the client device 300 based on the information in the content list, and stores the content in the storage unit 208.

For example, suppose a content whose ID is "REF-IMG09" (row 2) is specified as the unobtained content in a partial difference list 503 shown in FIG. 10 described later. The content obtainment unit 204 accesses the client device 300 using HTTP (HyperText Transfer Protocol) based on "http://10.90.0.2/REF-IMG09" (row 2, column 5) in the corresponding resource path, and obtains the content in the resource path.

The content obtainment unit 204 records an ID and a difference number of the obtained content, a save-destination file path of the content, and the like, in the obtained content table 400 shown in FIG. 4. The ID and the difference number of the obtained content are retrieved from the content list (mentioned above) obtained by the content list obtainment unit 203.

FIG. 5 is a diagram showing an obtained maximum difference number management table 450.

The content obtainment unit 204 further specifies, each time it performs content obtainment from the client device 300, a maximum difference number out of difference numbers assigned to all obtained contents in the above-mentioned obtained content table 400 (FIG. 4). The content obtainment unit 204 records the specified maximum difference number in the obtained maximum difference number management table 450 shown in FIG. 5. The obtained content table 400 will be described in detail later with reference to FIG. 4, and the obtained maximum difference number management table 450 will be described in detail later with reference to FIG. 5.

The obtained content application unit 205 sends an obtained latest difference number notification including the server ID of the content obtainment server 200, to the client device 300. The obtained latest difference number notification includes the maximum difference number out of all difference numbers associated with the one or more contents obtained from the client device 300. This maximum difference number is the above-mentioned maximum difference number recorded in the obtained maximum difference number management table 450.

Take the example of the obtained content table 400 shown in FIG. 4 and the obtained maximum difference number management table 450 shown in FIG. 5. The obtained content application unit 205 sends, to the client device 300 whose client ID is "CLIENT01" (rows 2 to 9 in FIG. 4), a maximum difference number "8" (row 9, column 4) out of all difference numbers associated with the client ID "CLIENT01", as the difference number. The obtained content application unit 205 sends, to the client device 300 whose client ID is "CLIENT02" (row 10), a maximum difference number "1" (row 10, column 4) out of all difference numbers associated with the client ID "CLIENT02", as the difference number.

The communication control unit 206 controls communication performed by the content obtainment server 200 via the network.

The display control unit 207 exercises control to display a content stored in the storage unit 208 or notification information to the user on the display 100.

The storage unit 208 provides a storage function of the content obtainment server 200, and stores each content obtained by the content obtainment unit 204, the obtained content table 400 shown in FIG. 4, and so on.

Figure 3:
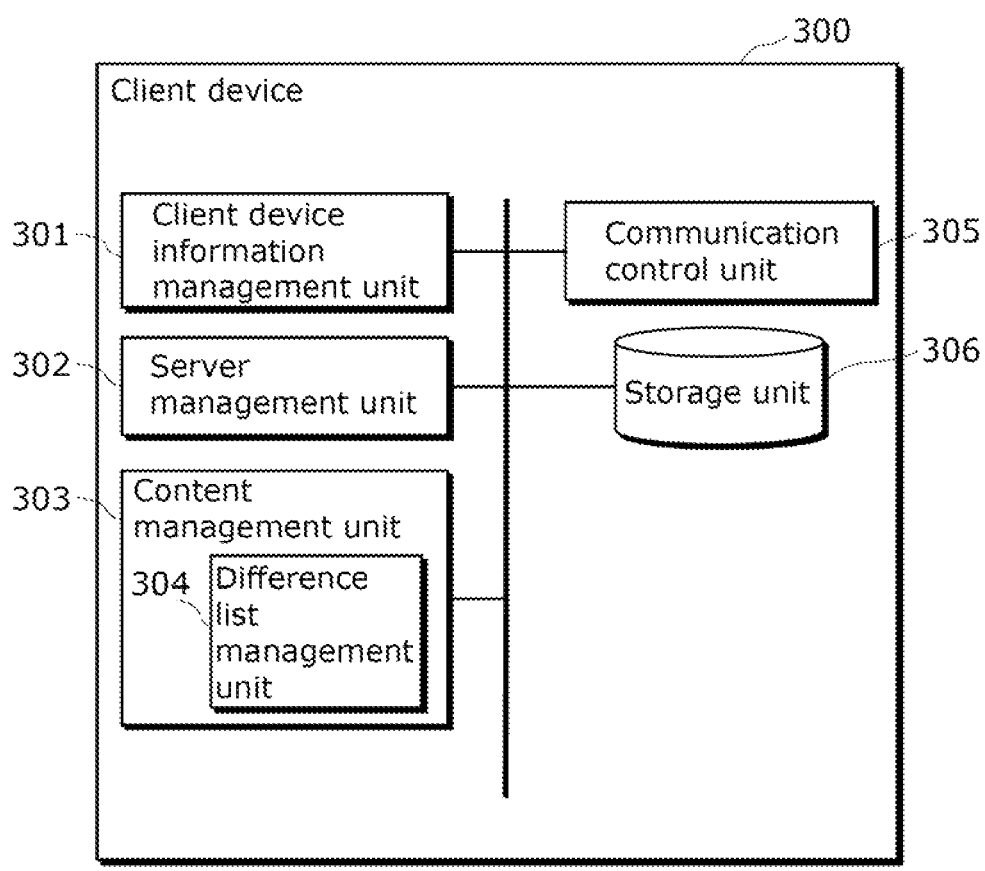
FIG. 3 is a block diagram showing a main structure of a client device in the embodiment of the present invention.

FIG. 3 is a block diagram showing a structure of the client device 300 (FIG. 1).

As shown in FIG. 3, the client device 300 includes a client device information management unit 301, a server management unit 302, a content management unit 303, a difference list management unit 304, a communication control unit 305, and a storage unit 306.

The client device information management unit 301 manages the above-mentioned client device information. The client device information management unit 301 provides the managed client device information to the content obtainment server 200, in response to the request of the content obtainment server 200. Note that the client ID included in the client device information is recorded in the storage unit 306 upon factory shipment or initialization of the client device 300.

The server management unit 302 receives the server registration request including the server ID of the content obtainment server 200, from the server registration application unit 202 in the content obtainment server 200. Upon receiving the server registration request, the server management unit 302 inquires of the user whether or not to permit the registration of the content obtainment server 200 in the client device 300. When the user permits the registration in response to the inquiry, the server management unit 302 registers the content obtainment server 200 sending the server registration request, in the client device 300.

FIG. 12 is a diagram showing a server management table 1100.

The server management unit 302 records the server ID (described earlier) included in the received server registration request, in the server management table 1100 shown in FIG. 12 (described later). By doing so, the server management unit 302 registers the content obtainment server 200 sending the server registration request, in the client device 300.

FIG. 11 is a diagram showing a content table 1000.

The content management unit 303 generates and updates the content table 1000 (FIG. 11) in which information about contents stored in the storage unit 306 is recorded. The content management unit 303 also operates as follows, in response to the request of the content obtainment server 200 to the client device 300. The content management unit 303 generates the content list from the content table 1000, and sends the generated content list to the content obtainment server 200. The content table will be described in detail later with reference to FIG. 11, and the content list will be described in detail later with reference to FIGS. 6 to 10.

The content management unit 303 includes the difference list management unit 304 (FIG. 3). The difference list management unit 304 especially has the following function out of the functions of the content management unit 303. The difference list management unit 304 manages information about each content not obtained by all content obtainment servers 200 recorded in the above-mentioned server management table 1100 (FIG. 12). As an example, when there are one or more contents not obtained by all content obtainment servers 200, the difference list management unit 304 manages one or more sets of information corresponding to the one or more contents. The content management unit 303 generates the difference list including the one or more sets of information.

The difference list does not include information about each content obtained by all content obtainment servers 200 recorded in the server management table 1100. Therefore, the difference list has less unnecessary information to the content obtainment server 200 than the full content list described earlier. The content obtainment server 200 obtains the difference list, to specify any unobtained content, i.e. any content not obtained from the client device 300 yet. This can reduce the amount of information to be obtained and the time to specify any unobtained content, as compared with the case of obtaining the full content list. Hereafter, the term "difference list" means the difference list generated by the difference list management unit 304, unless otherwise stated.

The difference list may be made up of a plurality of lists, with an upper limit being defined for the number of sets of content information included in each of the plurality of lists. When the number of sets of content information included in a list exceeds the upper limit, the list is divided into a plurality of difference lists. Each difference list generated by the division is hereafter referred to as a partial difference list. The difference list may have a hierarchical structure, as with the content list other than the difference list. In detail, a difference root list is generated as a parent list in a higher hierarchical level than a partial difference list. In this embodiment, the partial difference list and the difference root list are collectively referred to as the difference list.

The difference list management unit 304 also manages a numeric value called a difference number. The difference number is an index indicating whether or not a content has been obtained by the servers. Time series of content state change (e.g. content addition, update, deletion, etc.) is indicated by a difference number magnitude relation.

For example, the difference number may be a number started from "0" and increased by "1" upon each state change.

Thus, the difference number is defined for each content so that the time series of state change can be uniquely determined. According to this structure, it is sufficient to simply define a series of difference numbers in each client device 300. That is, each content obtainment server 200 compares, in magnitude, a latest difference number generated in the client device 300 with a maximum difference number out of difference numbers assigned to one or more obtained contents. Simply by performing such magnitude comparison, the content obtainment server 200 can easily determine whether or not there is any unobtained content.

Though this embodiment describes the case where the difference numbers are serial numbers in increments of "1", the difference numbers are not limited to serial numbers as long as they have some kind of magnitude relation so that theft order can be uniquely specified. That is, the difference numbers may be any data such as a sequence of numbers, characters, time stamps, or the like arranged according to a predetermined rule, as long as they are agreed in the system.

The difference list management unit 304 assigns the difference number upon each state change. In detail, the state of a content stored in the client device 300 changes when, for example, a content is newly added or a stored content is updated or deleted in the client device 300. Each time such a state change occurs, the difference list management unit 304 assigns the difference number increased by "1" as the maximum difference number, to the state-changed content. The difference list management unit 304 records information about the state-changed content and the assigned difference number in the content table 1000 (FIG. 11 described later), as difference content information. The difference list management unit 304 generates a partial difference list based on the difference content information. Hereafter, the term "difference number" means the difference number managed by the difference list management unit 304, unless otherwise stated.

The difference list management unit 304 receives the above-mentioned obtained latest difference number notification from the content obtainment server 200. The obtained latest difference number notification includes the server ID of the content obtainment server 200 and the maximum difference number (obtained latest difference number), as mentioned earlier. The obtained latest difference number represents the maximum difference number out of the difference numbers associated with the contents obtained by the content obtainment server 200 from the client device 300, as mentioned earlier.

Upon receiving the obtained latest difference number notification, the difference list management unit 304 updates an obtained latest difference number corresponding to the server ID included in the received obtained latest difference number notification, in the corresponding entry of the server management table 1100 shown in FIG. 12. The updated number is the obtained latest difference number included in the obtained latest difference number notification.

The difference list management unit 304 further receives a difference number notification request including the server ID of the content obtainment server 200, from the content obtainment server 200 at an arbitrary timing.

FIG. 13 is a diagram showing a difference number management table 1200.

Upon receiving the difference number notification request, the difference list management unit 304 notifies the content obtainment server 200 sending the difference number notification request, of a latest difference number recorded in the difference number management table 1200 (described later) shown in FIG. 13 and the client ID of the client device 300.

The difference list management unit 304 also stores the server ID included in the received difference number notification request, in a volatile memory. In the case where the difference number managed by the difference list management unit 304 is updated, the difference list management unit 304 notifies the content obtainment server 200 corresponding to each stored server ID, of the latest difference number in the difference number management table 1200 and the client ID of the client device 300.

Moreover, the difference list management unit 304 may notify the below-mentioned total number together with the latest difference number, each time the stored content state changes in the client device 300. The total number notified here is a total number of sets of information (difference content information) included in each of a plurality of partial difference lists 503. This total number may be notified to the content obtainment server 200 corresponding to each stored server ID, upon each state change. This enables the content obtainment server 200 to estimate a time required to obtain any unobtained content.

The communication control unit 305 controls communication performed by the client device 300 via the network.

The storage unit 306 provides a storage function of the client device 300, and stores each content, the content table 1000 shown in FIG. 11, the server management table 1100 shown in FIG. 12, the difference number management table 1200 shown in FIG. 13, and so on.

FIG. 4 mentioned earlier shows a data structure of the obtained content table 400 stored in the content obtainment server 200.

As shown in FIG. 4, a client ID, a content ID, a file path, and a difference number are recorded in the obtained content table 400.

In each row in FIG. 4, the client ID field (column 1) shows an identifier of the client device 300 from which the content obtainment server 200 has obtained the content of the row. The client ID is included in the above-mentioned client device information obtained by the client device information obtainment unit 201 in FIG. 2.

The content ID field (column 2) shows an identifier of the content of the row obtained from the client device 300. The content ID is included in the content list (mentioned earlier) obtained by the content list obtainment unit 203.

The file path field (column 3) shows a storage location of the content of the row in the content obtainment server 200.

The difference number field (column 4) shows a difference number. The difference number is a difference number associated with the content of the row obtained by the content obtainment server 200 from the client device 300. The difference number is included in the content list obtained by the content list obtainment unit 203.

For example, information (rows 2 to 10) about nine contents are recorded in the obtained content table 400 shown in FIG. 4. Information (row 2) about the first content out of the nine contents indicates the following: the content has been obtained from the client device 300 whose client ID is "CLIENT01"; the content ID of the content is "IMG01"; the content is stored in the location indicated by "/Data/IMG01.jpg" in the content obtainment server 200; and the difference number of the content is "1". Note that the information recorded in the obtained content table 400 is not limited to such, and may include a content size and the like.

FIG. 5 is a diagram showing a data structure of the obtained maximum difference number management table 450.

As shown in FIG. 5, a client ID (column 1) and a maximum difference number (column 2) corresponding to the client ID are recorded in each row of the obtained maximum difference number management table 450. The list of client IDs (column 1) recorded in the obtained maximum difference number management table 450 is the same as the list of client IDs recorded in the registration-complete client list not shown (mentioned earlier) which is managed by the server registration application unit 202.

The obtained maximum difference number management table 450 generated when the content obtainment server 200 is first linked with the client device 300. In the generation, the identifier of the client device 300 first linked with the content obtainment server 200 is recorded in the client ID field (column 1) in the row of the obtained maximum difference number management table 450. In addition, "0" is set in the maximum difference number field (column 2) in the row, as an initial value.

For example, the obtained maximum difference number management table 450 is updated each time the content obtainment server 200 obtains a content from the client device 300 and updates the obtained content table 400 shown in FIG. 4.

Note that the obtained maximum difference number management table 450 shown in FIG. 5 need not necessarily be generated. For instance, the maximum difference number may be retrieved from the obtained content table 400 shown in FIG. 4 each time the latest difference number is notified (described above) from the client device 300.

FIG. 6 is a diagram showing an example of a hierarchical structure of the content list (content list 500a) provided from the client device 300 to the content obtainment server 200.

Each entry (element) in the content list is classified as either a list (rectangle in FIG. 6) or content information (circle in FIG. 6). The content list is thus made up of a plurality of entries (lists and content information). Hence, the content list has a hierarchical structure, as shown in FIG. 6. The content information (circle) includes information about a content.

Each entry in the content list is generated from information recorded in the content table 1000 (FIG. 11) by the content management unit 303, regardless of whether the entry is a list or content information.

In FIG. 6, each list is represented by the rectangle, whereas each set of content information is represented by the circle. Each parenthesized character string indicates an identifier of a list or content information.

For example, in FIG. 6, the content list starts from a root list 500. The root list 500 includes an image list 501, a music list, and a difference root list 502. The image list 501 includes thirty sets of content information ("IMG01" to "IMG30") about images.

The difference root list 502 includes three partial difference lists 503. Of the three partial difference lists 503, a partial difference list "DIFF-LIST01" includes two sets of difference content information ("REF-IMG09" and "REF-IMG10"). Though a partial difference list "DIFF-LIST02" and a partial difference list "DIFF-LIST03" each include ten sets of difference content information, they are omitted in the drawing.

Hereafter, the difference root list 502, each partial difference list 503, and each set of difference content information are collectively referred to as a "difference list", as enclosed by the dashed line in FIG. 6. The difference content information (such as "REF-IMG09") exists only for specifying an unobtained content of the content obtainment server 200, and is a content with no substance. This being so, the lower entries indicated by the circles need not necessarily be included in the partial difference list. However, the structure of also including the difference content information in the lowest hierarchical level in the difference list as shown in FIG. 6 has an advantageous effect that each difference entry can be treated in the same way as other normal entries such as "Image" and "music". Specific examples of the root list 500, the image list 501, the difference root list 502, and the partial difference list 503 in FIG. 6 are described below, with reference to FIGS. 7 to 10. Though the difference root list 502 and the partial difference list 503 are distinguished from each other below for ease of explanation, their elements are not substantially different.

FIG. 7 is a diagram showing a data structure of the root 500 in FIG. 6.

As shown in FIG. 7, a content ID, a reference ID, a type, a child count, a resource path, a difference number, and a difference state are recorded in the root list 500. The data structure is the same regardless of whether the entry type is a list or content information. For example, the structure shown in FIG. 7 is a structure common to all lists as described later (see below-mentioned FIGS. 8 to 10).

Note that "−1" in each element means no value is set to the element. It is assumed hereafter that "−1" means no value is set to the element, unless otherwise stated. This is not limited to the elements in the root list 500 but apply to the other elements.

In each row of the root list 500, the content ID field (column 1) shows an identifier unique to the entry of the row, for specifying the entry out of all entries in the content list.

The reference ID field (column 2) shows, in the case where content information (e.g. REF-IMG09 in FIG. 6) indicated by a content ID in the row references to other content information (IMG09) included in the content list, a content ID of the content information referenced to (e.g. row 2, column 2 in FIG. 10). In the case where two or more related sets of content information are included in the content list (such as REF-IMG09 and IMG09 in FIG. 6), the original content information can be specified through the use of such a reference ID. On the other hand, in the case where the entry is a list or in the case where the entry is content information but does not reference to other content information, the reference ID field is set to "−1" (see FIG. 7, etc.).

The type field (column 3) shows a type of the entry. Values set in the type field are "root list", "image list", "music list", "difference root list", "partial difference list", "image", "music", and "difference". "Root list" represents a list (the root list 500 in FIG. 6) in a highest hierarchical level in the content list. "Image list" represents a list (see row 2, column 3 in FIG. 7, FIG. 8) including image content information. "Music list" represents a list (see row 3, column 3 in FIG. 7, etc.) including music content information, "Partial difference list" represents a partial difference list (see column 3 in FIG. 9, FIG. 10). "Image" represents image content information (FIG. 8). "Music" represents music content information. "Difference" represents difference content information (FIG. 10). However, the type set in the type field is not limited to such. For example, "moving image list" or "moving image" may be set in the type field in the case where moving image content information is included in the content list. Note that the difference content information indicates content information of a content whose state has undergone a change such as deletion or addition in the client device 300 as described earlier, and is recorded in the content table 1000 (FIG. 11) by the difference list management unit 304.

The child count field (column 4) shows, in the case where the row (entry) to which the field belongs corresponds to a list (rows 2 and 4 in FIG. 7, etc.), the number of entries included in the list. In the case where the entry is content information (row 3), on the other hand, the child count field is set to "−1" because there is no lower entry.

The resource path field (column 5) shows an HTTP address as an access destination path for obtaining the list or content.

The difference number field (column 6) is set to the numeric value managed by the difference list management unit 304, as mentioned above. Note that this numeric value is set only in the case where the entry type is "difference root list", "partial difference list", or "difference". In the case where the entry type is other than these, the difference number field is set to "−1".

In the case where the entry type is "difference", the difference number field is set to a difference number associated with difference content information indicated by the entry. In the case where the entry type is "partial difference list", on the other hand, the difference number field is set to a maximum difference number out of difference numbers associated with difference content information included in the partial difference list indicated by the entry.

The difference state field (column 7) shows a state of a content indicated by difference content information, and is set only in the case where the entry type is "difference". In the case where the entry type is other than "difference", the difference state field is set to "−1". Values set in the difference state field are "add", "update", and "delete". These values respectively indicate that the content indicated by the difference content information is newly added, updated, and deleted. The reference ID field and the resource path field of each entry whose difference state is "delete" are set to "−1".

For instance, the root list 500 in FIG. 7 has three entries (rows 2 to 4). The first entry is a list whose content ID is "IMG-LIST01" and whose type is "image list". The number of entries in the list is "30", and the content of the entry can be obtained by accessing "http://10.0.0.2/IMG-LIST01".

The resource path of the root list 500 is included in the client device information (mentioned earlier) managed by the client device information management unit 301. However, the present invention is not limited to this method of including the resource path of the root list 500 in the client device information. For example, the resource path may be set in the content collection system beforehand.

The structure of the root list 500 and the meaning of each element in the root list 500 apply not only to the root list 500, but are common to all lists included in the content list. The elements in the content list are not limited to such, and may include information of a content size and the like.

FIG. 8 is a diagram showing a structure of the image list 501 in FIG. 6.

Since the structure of the image list 501 is the same as that of the root list 500 as mentioned above, its detailed description is omitted. In FIG. 8, the image list 501 has thirty entries from "IMG01" to "IMG30". The first entry is content information whose content ID is "IMG01" and whose type is "image". An image which is the content of the entry can be obtained by accessing "http://10.0.0.2/IMG01.jpg".

FIG. 9 is a diagram showing a structure of the difference root list 502 in FIG. 6.

Since the structure of the difference root list 502 is the same as that of the root list 500 as mentioned above, its detailed description is omitted. In FIG. 9, the difference root list 502 has three entries "DIFF-LIST01" to "DIFF-LIST03". The first entry is a partial difference list whose content ID is "DIFF-LIST01" and whose type is "partial difference list". The number of entries in the partial difference list is "2", the difference number of the partial difference list is "10", and the content of the entry can be obtained by accessing "http://10.0.0.2/DIFF-LIST01".

In this example, the resource path of the difference root list 502 is included in the root list 500 (row 4, column 5 in FIG. 7). Alternatively, the resource path may be included in the client device information managed by the client device information management unit 301. That is, the client device information may include the resource path of the difference root list 502. This enables the content obtainment server 200 to directly obtain the difference root list 502 without obtaining the root list 500, with it being possible to further reduce the processing time to obtain the content list.

FIG. 10 is a diagram showing a structure of the partial difference list 503 in FIG. 6.

Since the structure of the partial difference list 503 is the same as that of the root list 500 as mentioned above, its detailed description is omitted. In FIG. 10, the partial difference list 503 has two entries "REF-IMG09" and "REF-IMG10". The first entry is difference content information whose content ID is "REF-IMG09", whose reference ID is "IMG09", and whose type is "difference". The difference number of the difference content information is "9", the difference state of the difference content information is "add", and the content of the entry can be obtained by accessing "http://10.0.0.2/REF-IMG09". As can be understood from the difference state "add" in column 7, this entry is difference content information indicating that the content whose content ID is "IMG09" is newly added to the client device 300.

FIG. 11 is a diagram showing a structure of the content table 1000 in which information about contents stored in the client device 300 is recorded.

The content table 1000 is generated by the content management unit 303. The content management unit 303 updates the content table 1000, each time a content is added, modified, or deleted in the client device 300. The content management unit 303 also generates the content list based on the information in the content table 1000, in response to the request of the content obtainment server 200.

In FIG. 11, the content table 1000 includes a content ID, a reference ID, a type, a parent list, a child count, a file path, a difference number, and a difference state (columns 1 to 8). The elements other than the parent list (column 4) and the file path (column 6) have the same meanings as the elements of the same names in the content list shown in FIGS. 7 to 10, and so their detailed description is omitted.

In each row (e.g. row 6) of the content table 1000, the parent list field ("IMG-LIST01") shows a content ID (ROOT-LIST) of a list (the root list 500 in FIG. 7) which is included in the content list and in which the entry (row 2 in FIG. 7) of the content (the image list 501 in FIG. 8) of the row is included. For instance, the entry (row 2 in FIG. 7) of the list (FIG. 8) whose content ID is "IMG-LIST01" is included in the list (ROOT-LIST in FIG. 7) whose content ID is "ROOT" (row 6, column 4 in FIG. 11), as mentioned above. The content management unit 303 generates the hierarchical structure of the content list based on such parent list information.

The file path field (column 6 in FIG. 11) shows a content save destination in the storage unit 306. The resource path field (e.g. column 5 in FIG. 7) in the content list shows an access destination path (including a network host name or an IP address of the client device 300) used by the content obtainment server 200 to obtain a list or a content from the client device 300. Meanwhile, the file path field shows a content save destination (including a directory name or a filename) inside the client device 300. The content management unit 303 generates the resource path in the content list from the file path in the content table 1000, in response to the request of the content obtainment server 200.

FIG. 12 is a diagram showing a structure of the server management table 1100 managed by the client device 300.

The server management table 1100 is a table in which information about the obtained latest difference number notification (mentioned above) received by the client device 300 from the content obtainment server 200 is recorded, as described earlier. In FIG. 12, a server ID (column 1) and an obtained latest difference number (column 2) are recorded in the server management table 1100.

The server ID field (column 1) shows a server ID which is an identifier unique to the content obtainment server 200.

The obtained latest difference number field (column 2) shows a maximum difference number out of all difference numbers associated with the contents obtained by the content obtainment server 200 from the client device 300. The obtained latest difference number field set to "−1" indicates that no obtained latest difference number notification has been received from the content obtainment server 200 of the corresponding server ID. In this case, the client device 300 treats the corresponding content obtainment server 200 as having not obtained a content included in the difference list from the client device 300.

For example, the first entry (row 2) in the server management table 1100 indicates that the content obtainment server 200 whose server ID is "SERVER01" has obtained all contents associated with the difference numbers equal to or less than "8". The third entry (row 4) in the server management table 1100 indicates that no obtained latest difference number notification has been received from the content obtainment server 200 whose server ID is "SERVER03".

FIG. 13 is a diagram showing a structure of the difference number management table 1200 managed by the client device 300.

In FIG. 13, a latest difference number in the client device 300 is recorded in the difference number management table 1200. The latest difference number field (column 1) shows the current difference number managed by the difference list management unit 304. The difference list management unit 304 assigns a new difference number to a content newly added, updated, or deleted in the client device 300, based on the information in the difference number management table 1200.

The following describes operations of the client device 300 in each of the case where a content is newly added to the client device 300, the case where a content stored in the client device 300 is updated, and the case where a content stored in the client device 300 is deleted.

In the case where a content is newly added to the client device 300, the content management unit 303 in the client device 300 records information about the state-changed content in the content table 1000 (FIG. 11). Here, an identifier automatically assigned to the content by the content management unit 303 is recorded in the content ID field in the content table 1000. "Image", "music", or the like is recorded in the type field according to the type of the added content. A content ID of a list whose type corresponds to the content type, such as "image list" when the type of the added content is "image" or "music list" when the type of the added content is "music", is recorded in the parent list field. A save destination of the content in the storage unit 306 is recorded in the file path field. "−1" is recorded in each of the reference ID field, the child count field, the difference number field, and the difference state field.

In the case where a content stored in the client device 300 is updated, the content management unit 303 ends the process without updating the content table 1000. In the case where information such as a last update date and time or the like is included in the elements of the content table 1000, however, the content management unit 303 updates the corresponding information.

In the case where a content stored in the client device 300 is deleted, the content management unit 303 deletes information of the content from the content table 1000.

Figure 14:
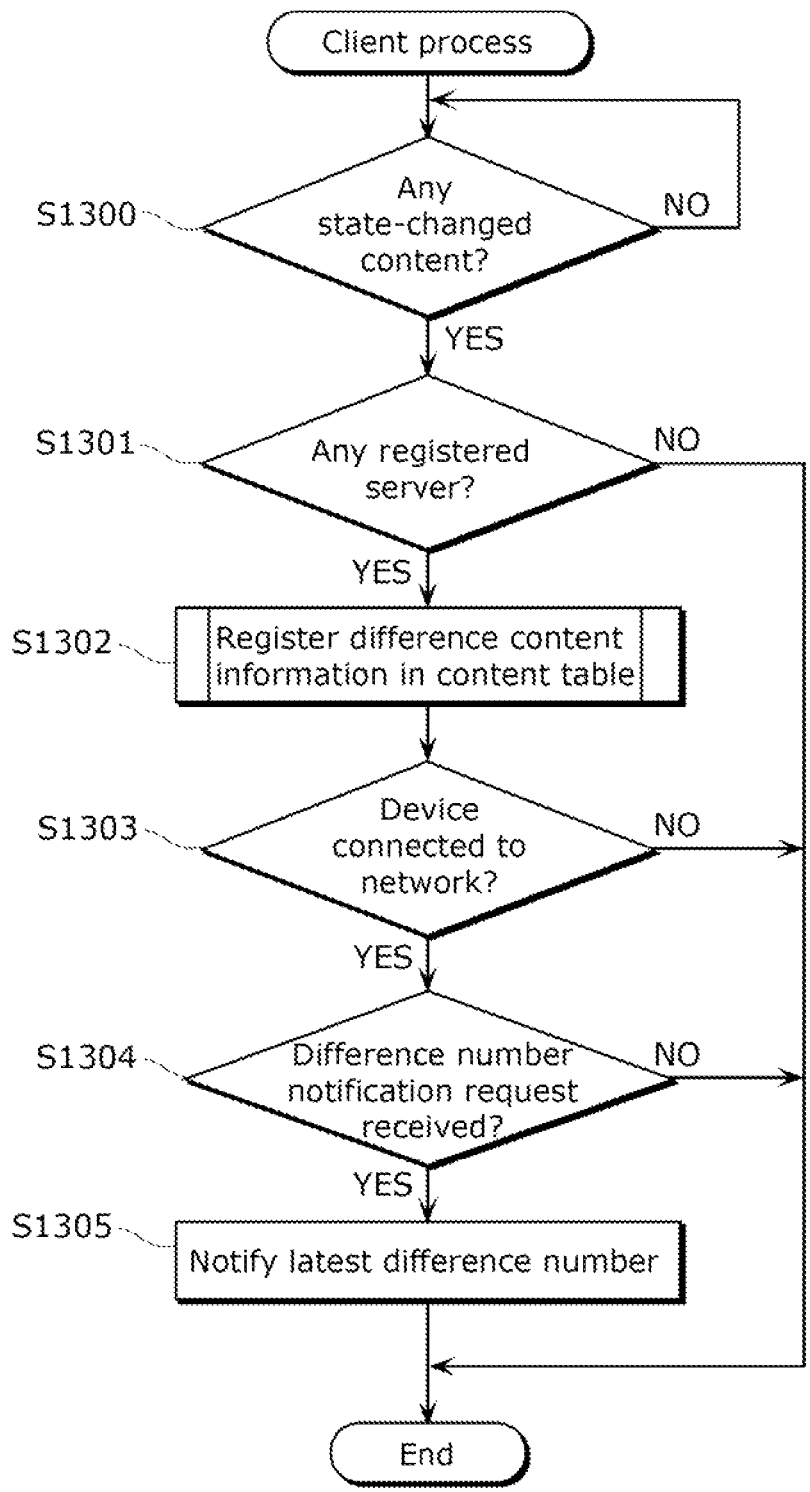
FIG. 14 is a flowchart showing part of a process flow of the client device in the case where a stored content state changes in the embodiment of the present invention.

FIG. 14 is a flowchart showing part of a process flow of the client device in the case where the stored content state changes in the embodiment of the present invention.

In detail, the case where the stored content state changes in the client device 300 is any of when a content is newly added to the client device 300, when a content stored in the client device 300 is updated, and when a content stored in the client device 300 is deleted. In each of these cases, after the client device 300 performs the above-mentioned process such as deletion, the difference list management unit 304 performs a common process shown in the flowchart in FIG. 14. Hereafter, when not distinguishing whether the content is a content added, updated, or deleted in the client device 300, the content is collectively referred to as a "state-changed content".

The process in FIG. 14 is described below. First, the content management unit 303 monitors whether or not there is a state-changed content in the client device 300, at each predetermined time interval (Step S1300).

In the case where there is a state-changed content (Step S1300: YES), the difference list management unit 304 references to the server management table 1100 (FIG. 12), to determine whether or not there is at least one registered content obtainment server 200 (Step S1301). In the case where there is no registered content obtainment server 200 (Step S1301: NO), the difference list management unit 304 ends the process.

In the case where there is at least one registered content obtainment server 200 (Step S1301: YES), the difference list management unit 304 records difference content information generated in association with the state-changed content, in the content table 1000 (FIG. 11) (Step S1302).

Next, the difference list management unit 304 determines whether or not the client device 300 is already connected to the network (Step S1303). In the case where the client device 300 is not connected to the network (Step S1303: NO), the difference list management unit 304 ends the process.

In the case where the client device 300 is connected to the network (Step S1303: YES), the difference list management unit 304 operates as follows. The difference list management unit 304 determines whether or not the client device 300 has received the difference number notification request (mentioned earlier) from any of the content obtainment servers 200 (Step S1304). As described above, the difference list management unit 304 receives the difference number notification request from the content obtainment server 200 at an arbitrary timing, and stores the server ID included in the received difference number notification request in the volatile memory.

In the case where the client device 300 has not received the difference number notification request from any content obtainment server 200 (Step S1304: NO), the difference list management unit 304 ends the process. In the case where the client device 300 has received the difference number notification request from any content obtainment server 200 (Step S1304: YES), the difference list management unit 304 notifies the latest difference number in the difference number management table 1200, to all content obtainment servers 200 from which the client device 300 has received the difference number notification request (Step S1305).

Here, a time interval may be set in the difference list management unit 304 or the like so that the difference list management unit 304 notifies the latest difference number to the content obtainment server 200 at the set time interval. In this case, the difference list management unit 304 does not execute Step S1305, unless the set time interval elapses from the last notification. The time interval for notification may be, for example, 200 milliseconds. Setting the time interval for notification in this way can suppress any inappropriate operation in the case where a plurality of contents change in state in a short time in the client device 300. That is, the difference list management unit 304 can be prevented from continuously sending a plurality of notifications to the content obtainment server 200 in a short time. The processing load on the content obtainment server 200 can thus be reduced.

Figure 15:
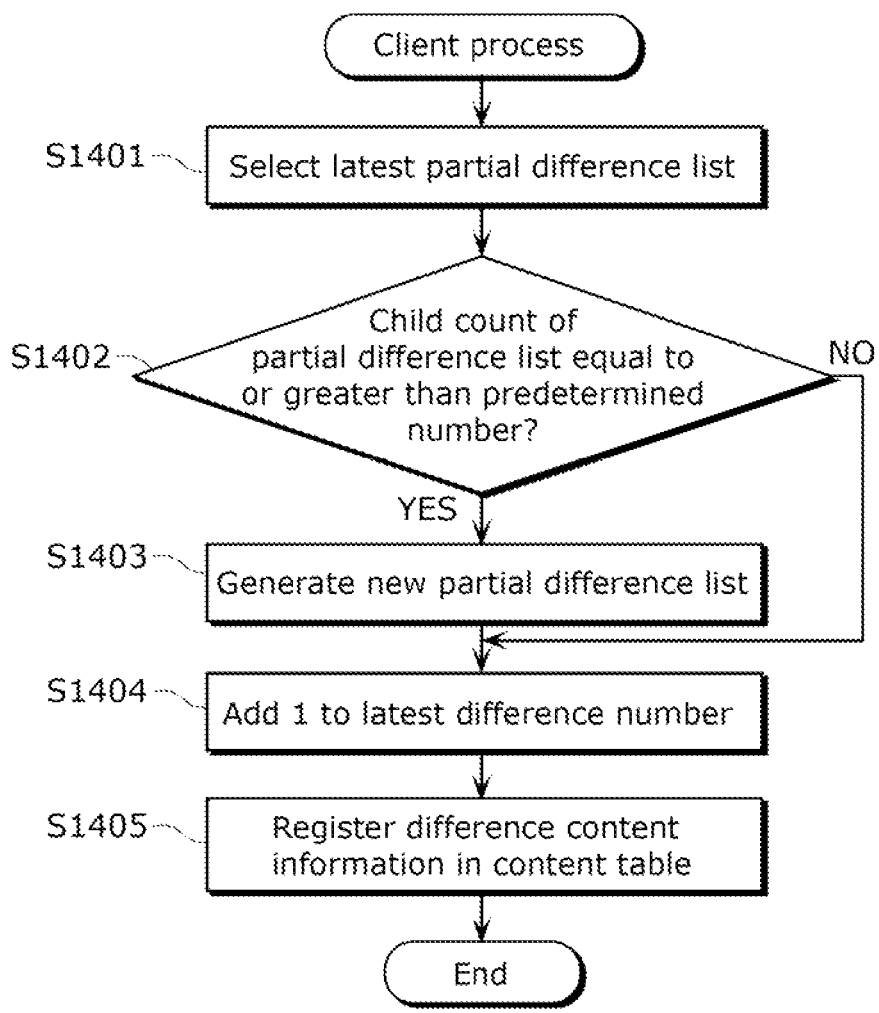
FIG. 15 is a flowchart showing a process flow in which the client device generates a partial difference list in the embodiment of the present invention.

FIG. 15 is a flowchart showing a process flow in which the client device generates a partial difference list in the embodiment of the present invention. FIG. 15 corresponds to Step S1302 in FIG. 14. The process in FIG. 15 is described below.

First, the difference list management unit 304 references to the content table 1000, and selects a latest partial difference list (Step S1401). The latest partial difference list mentioned here is a partial difference list of an entry having a maximum difference number out of all entries of the type "partial difference list" in the content table 1000. In the case where there is no entry of the type "partial difference list" in the content table 1000, the difference list management unit 304 newly generates an entry of the type "partial difference list", and sets "ROOT" indicating the root list in the parent list field of the generated entry.

Following this, the difference list management unit 304 determines whether or not the child count of the latest partial difference list is equal to or greater than a predetermined number (Step S1402). In this embodiment, the predetermined number is 10. In the case where the child count of the partial difference list is not equal to or greater than the predetermined number (Step S1402: NO), the difference list management unit 304 proceeds to Step S1404. In the case where the child count of the partial difference list is equal to or greater than the predetermined number (Step S1402: YES), the difference list management unit 304 adds a new partial difference list to the content table 1000 (Step S1403). The difference list management unit 304 updates the latest difference number in the difference number management table 1200 (FIG. 13), by adding 1 to the latest difference number (Step S1404). The difference list management unit 304 then generates difference content information based on the state-changed content, and adds the difference content information to the content table 1000 (Step S1405). Here, a content ID of the latest partial difference list selected in Step S1401 is set in the parent list field of the difference content information. In the case of executing Step S1403, on the other hand, a content ID of the partial difference list added in Step S1403 is set in the parent list field. When adding the difference content information to the content table 1000, the difference list management unit 304 also updates the difference number of the list indicated by the parent list field of the added difference content information, to the difference number of the added content information.

Through the above-described process in FIG. 15, the difference list management unit 304 records, in the content table 1000, information about the state-changed content in the client device 300.

Figure 16:
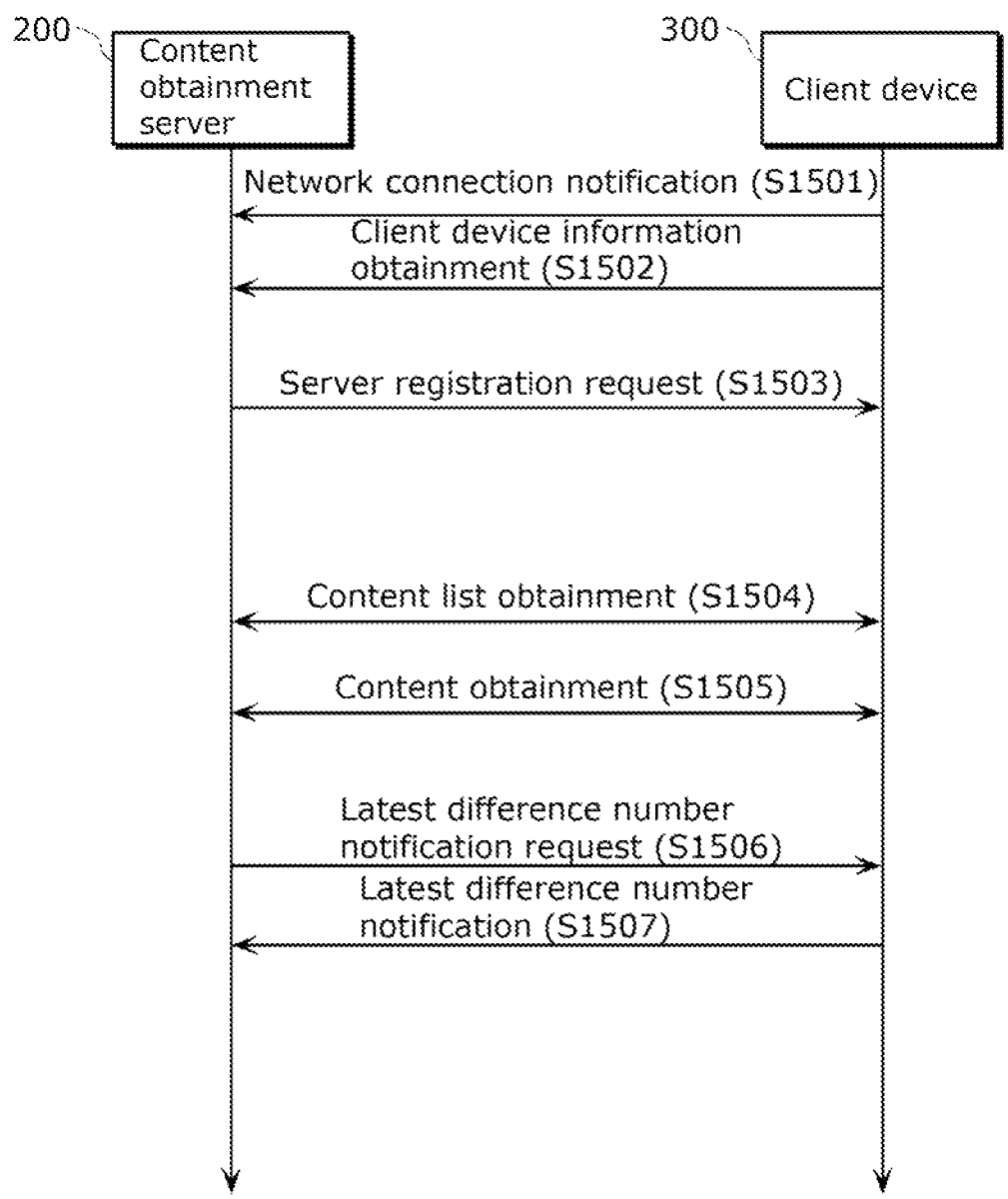
FIG. 16 is a sequence diagram showing a process flow in which the content obtainment server performs content obtainment from the client device for the first time in the embodiment of the present invention.

FIG. 16 is a sequence diagram showing a process flow in which the content obtainment server performs content obtainment from the client device for the first time in the embodiment of the present invention.

The first time operation mentioned here is an operation performed in the case where the client ID of the client device 300 is not included in the registration-complete client list stored in the content obtainment server 200. Whether or not the operation is the first time operation or the second or subsequent time operation can be determined when the content obtainment server 200 obtains the client device information (Step S1502 in FIG. 16). This will be described in detail later, in the description of Step S1502.

The process in FIG. 16 is described below. First, the client device 300 connects to the network, and sends a network connection notification to all terminals on the network (Step S1501). Here, the information is sent to all terminals on the network according to a method defined for the network. Moreover, the content obtainment server 200 may connect to the network. In this case, the content obtainment server 200 requests all terminals on the network to notify network connection. By making this request, the content obtainment server 200 receives the network connection notification from the client device 300.

Having received the network connection notification, the client device information obtainment unit 201 in the content obtainment server 200 obtains the client device information from the client device information management unit 301 (Step S1502).

Next, the server registration application unit 202 determines whether or not the client ID included in the client device information obtained in Step S1502 is included in the registration-complete client list (mentioned earlier) stored in the storage unit 208. In the case where the client ID is included in the registration-complete client list, this is the second or subsequent time for the content obtainment server 200 to perform content obtainment from the client device 300 corresponding to the obtained client device information. The process performed after the determination in such a case will be described later with reference to FIG. 17. In the case where the client ID is not included in the registration-complete client list, on the other hand, the server registration application unit 202 (FIG. 2) sends the server registration request (mentioned earlier) including the server ID to the server management unit 302, either automatically or when permitted by the user (Step S1503).

Upon receiving the server registration request, the server management unit 302 records the server ID included in the server registration request in the server management table 1100 (column 1 in FIG. 12) when permitted by the user, and notifies the server registration application unit 202 of the registration success. Here, the server management unit 302 sets "−1" in the obtained latest difference number field (column 2 in FIG. 12) corresponding to the server ID (column 1 in FIG. 12) recorded in the server management table 1100. When not permitted by the user, on the other hand, the server management unit 302 notifies the server registration application unit 202 of the registration failure. Alternatively, upon receiving the server registration request, the server management unit 302 may automatically record the server ID in the server management table 1100 without gaining the user's permission. Such automatic recording can save the user's trouble.

In the case where the server registration request is successful, the server registration application unit 202 adds the client ID of the client device 300 in which the registration is successful, to the registration-complete client list (mentioned earlier). In the case where the server registration request fails, the content obtainment server 200 notifies the user of the failure and ends the process.

Next, the content list obtainment unit 203 (FIG. 2) obtains the content list from the content management unit 303 (FIG. 3) (Step S1504). For example in the case where the content list has the structure as shown in FIG. 6, the content list obtainment unit 203 first obtains the root list. The content list obtainment unit 203 then obtains the image list and the music list, based on the information in the root list. Thus, in the case where one list includes information about any other list, the content list obtainment unit 203 obtains the other list recursively. Note, however, that the content list obtainment unit 203 does not obtain the difference root list and the partial difference list in the first time operation of content obtainment from the client device 300.

Following this, the content obtainment unit 204 performs content obtainment from the content management unit 303, based on the content list obtained in Step S1504 (Step S1505). The content obtainment unit 204 records information about each obtained content, in the obtained content table 400 (FIG. 4). Here, the content obtainment unit 204 obtains all contents in the content list.

The content list obtainment unit 203 (FIG. 2) then sends the latest difference number notification request (mentioned earlier) including the server ID, to the difference list management unit 304 (FIG. 3) (Step S1506). Upon receiving the latest difference number notification request, the difference list management unit 304 stores the server ID included in the received difference number notification request, in the volatile memory. The difference list management unit 304 then notifies the content list obtainment unit 203 of the latest difference number in the difference number management table 1200 (FIG. 13), together with the client ID of the client device 300 (Step S1507).

Subsequently, in the case where the difference number is updated, the difference list management unit 304 notifies the latest difference number in the difference number management table 1200 to each content obtainment server 200 whose server ID is stored. Here, the latest difference number is notified together with the client ID of the client device 300. Upon receiving the latest difference number, the content obtainment server 200 performs the process from Step S1605 in FIG. 17.

In Step S1507, the difference list management unit 304 may notify the content list obtainment unit 203 of the number of entries of the type (column 3) "difference" in the content table 1000 (FIG. 11) (i.e. the total number of sets of difference content information in the partial difference lists), in addition to the latest difference number in the difference number management table 1200 and the client ID. Notifying the number of entries of the type "difference" enables the content list obtainment unit 203 to, for instance, estimate the time required for the partial difference list obtainment and present the estimated time to the user. In the content table 1000 shown in FIG. 11, for example, the number of entries of the type "difference" is 22.

In this embodiment, it is defined beforehand that the difference number is increased by "−1". In the case where such a difference number setting rule is defined beforehand, instead of notifying the number of entries of the type "difference", the difference list management unit 304 may notify the content list obtainment unit 203 of the minimum difference number out of the difference numbers set in the entries of the type "difference" in the content table 1000. In the case where it is defined beforehand that the difference number is increased by "1" as in this embodiment, the number of entries in the partial difference lists is calculated by adding 1 to the result of subtracting the minimum difference number from the received latest difference number ("30" in FIG. 13). Thus, the above-mentioned number of entries can be specified from the minimum difference number. The notification of the minimum difference number therefore has the same effect as the above-mentioned notification of the number of entries of the type "difference".

For example, the latest difference number is "30" in the difference number management table 1200 shown in FIG. 13. Meanwhile, the minimum difference number out of the entries of the type "difference" in the content table 1000 shown in FIG. 11 is "9". From "30" and "9", the number of entries of the type "difference" can be calculated at "22", according to the expression "30−9+1".

Figure 17:
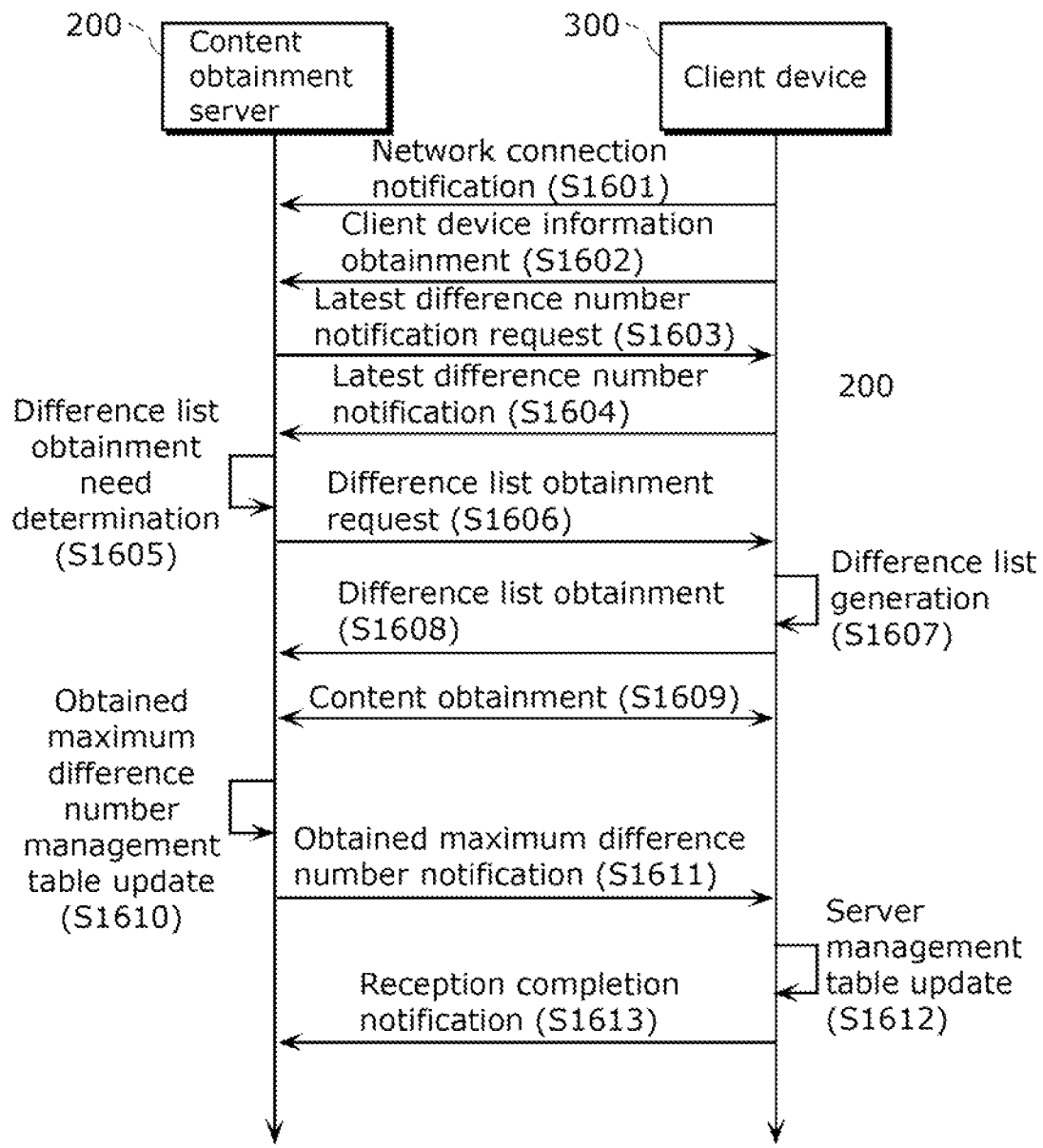
FIG. 17 is a sequence diagram showing a process flow in which the content obtainment server performs content obtainment from the client device for the second or subsequent time in the embodiment of the present invention.

FIG. 17 is a sequence diagram showing a process flow in which the content obtainment server performs content obtainment from the client device for the second or subsequent time in the embodiment of the present invention.

The second or subsequent time operation mentioned here is an operation performed in the case where the client ID of the client device 300 is included in the registration-complete client list (mentioned above) stored in the content obtainment server 200. Whether or not the operation is the first time operation or the second or subsequent time operation can be determined when the content obtainment server 200 obtains the client device information (Step S1502 in FIG. 16, Step S1602 in FIG. 17).

Steps S1601 and S1602 in FIG. 17 are the same as Steps S1501 and S1502 in FIG. 16. Steps S1603 and S1604 in FIG. 17 are the same as Steps S1506 and S1507 in FIG. 16. Step S1609 in FIG. 17 is the same as Step S1505 in FIG. 16. Since the steps in FIG. 16 have already been described, the detailed description of the same steps as in FIG. 16 is omitted accordingly.

The process in FIG. 17 is described below. First, the client device 300 connects to the network, and sends the network connection notification to all terminals on the network (Step S1601). Having received the network connection notification, the client device information obtainment unit 201 in the content obtainment server 200 obtains the client device information from the client device information management unit 301 (Step S1602).

The server registration application unit 202 determines whether or not the client ID included in the client device information obtained in Step S1602 is included in the registration-complete client list stored in the storage unit 208. In the case where the client ID is not included in the registration-complete client list, this is the first time for the content obtainment server 200 to perform content obtainment from the corresponding client device 300. The process performed subsequently in such a case is as described with reference to FIG. 16. In the case where the client ID is included in the registration-complete client list, the content list obtainment unit 203 sends the latest difference number notification request including the server ID, to the difference list management unit 304 (Step S1603). Upon receiving the latest difference number notification request, the difference list management unit 304 stores the received server ID in the volatile memory, and notifies the content list obtainment unit 203 of the latest difference number in the difference number management table 1200, together with the client ID (Step S1604).

Upon receiving the content. ID and the latest difference number, the content list obtainment unit 203 reads, from the obtained maximum difference number management table 450, the maximum difference number corresponding to the same client ID as the received client ID. The content list obtainment unit 203 compares the read maximum difference number with the received latest difference number (Step S1605). In the case where the read maximum difference number is equal to or greater than the received latest difference number as a result of the comparison, the content list obtainment unit 203 determines that any content not obtained by the content obtainment server 200 is not stored in the client device 300. In this case, the content obtainment server 200 ends the process of content obtainment from the client device 300.

In the case where the read maximum difference number is less than the received latest difference number as a result of the comparison, the content list obtainment unit 203 determines that any content not obtained by the content obtainment server 200 is stored in the client device 300. In this case, the content obtainment server 200 continues the content obtainment process.

The content list obtainment unit 203 sends the difference list obtainment request to the difference list management unit 304 (Step S1606). Upon receiving the difference list obtainment request, the difference list management unit 304 dynamically generates the difference root list 502 shown in FIG. 9 and the partial difference list 503 shown in FIG. 10 from the content table 1000 shown in FIG. 11 (Step S1607). The difference list management unit 304 sends the generated difference root list 502 and partial difference list 503 to the content list obtainment unit 203.

The content list obtainment unit 203 obtains the difference root list 502 and the partial difference list 503 from the difference list management unit 304 (Step S1608). The process performed by the content list obtainment unit 203 in Steps S1605 to S1608 will be described in detail later with reference to FIG. 18.

Next, the content obtainment unit 204 performs content obtainment from the content: obtainment unit 303, based on the difference list obtained in Step S1608 (Step S1609). The content obtainment unit 204 records information about each obtained content, in the obtained content table 400 (FIG. 4). The content obtainment unit 204 also records the maximum difference number out of the difference numbers of the obtained entries, in the obtained maximum difference number management table 450 (FIG. 5) (Step S1610). Here, the content obtainment unit 204 obtains all contents in the partial difference list 503. For each content whose difference state (column 7 in FIG. 10) is "delete", the resource path (column 5) is set to "−1", and so the content obtainment unit 204 actually does not obtain such content. However, the subsequent process is performed based on an assumption that such content is obtained, too.

Following this, the obtained content application unit 205 references to the maximum difference number (column 2 in FIG. 5) in the obtained maximum difference number management table 450. The obtained latest difference number notification mentioned earlier includes this maximum difference number, i.e. the maximum difference number out of all contents obtained in Step S1609, and the server ID. Having referenced to the maximum difference number, the obtained content application unit 205 sends the obtained latest difference number notification to the difference list management unit 304 (Step S1611).

Upon receiving the obtained latest difference number notification, the difference list management unit 304 records the received information in the server management table 1100, thus updating the server management table 1100 (Step S1612). Step S1612 will be described in detail later with reference to FIG. 19.

The difference list management unit 304 then sends a reception completion notification of the obtained latest difference number notification to the obtained content application unit 205 (Step S1613).

In Step S1609, the content obtainment unit 204 operates as follows. The partial difference list (FIG. 10) obtained in Step S1608 may include any entry whose difference state (column 7) is "delete". In the case where a content of such an entry is included in the obtained content table 400 (FIG. 4), the content obtainment unit 204 deletes information about the content from the obtained content table 400. Here, the content obtainment unit 204 may: delete a file of the content from the storage unit 208 in addition to deleting the information about the content; perform no process other than deleting the information about the content; notify the user of the deletion; or perform a process based on information preset by the system. The content obtainment unit 204 may execute only one of these processes, or execute two or more of these processes. In the case where the content obtainment unit 204 deletes the information about the content and the file, the contents stored in the content obtainment server 200 can be made to be consistent with the contents stored in the client device 300.

Figure 18:
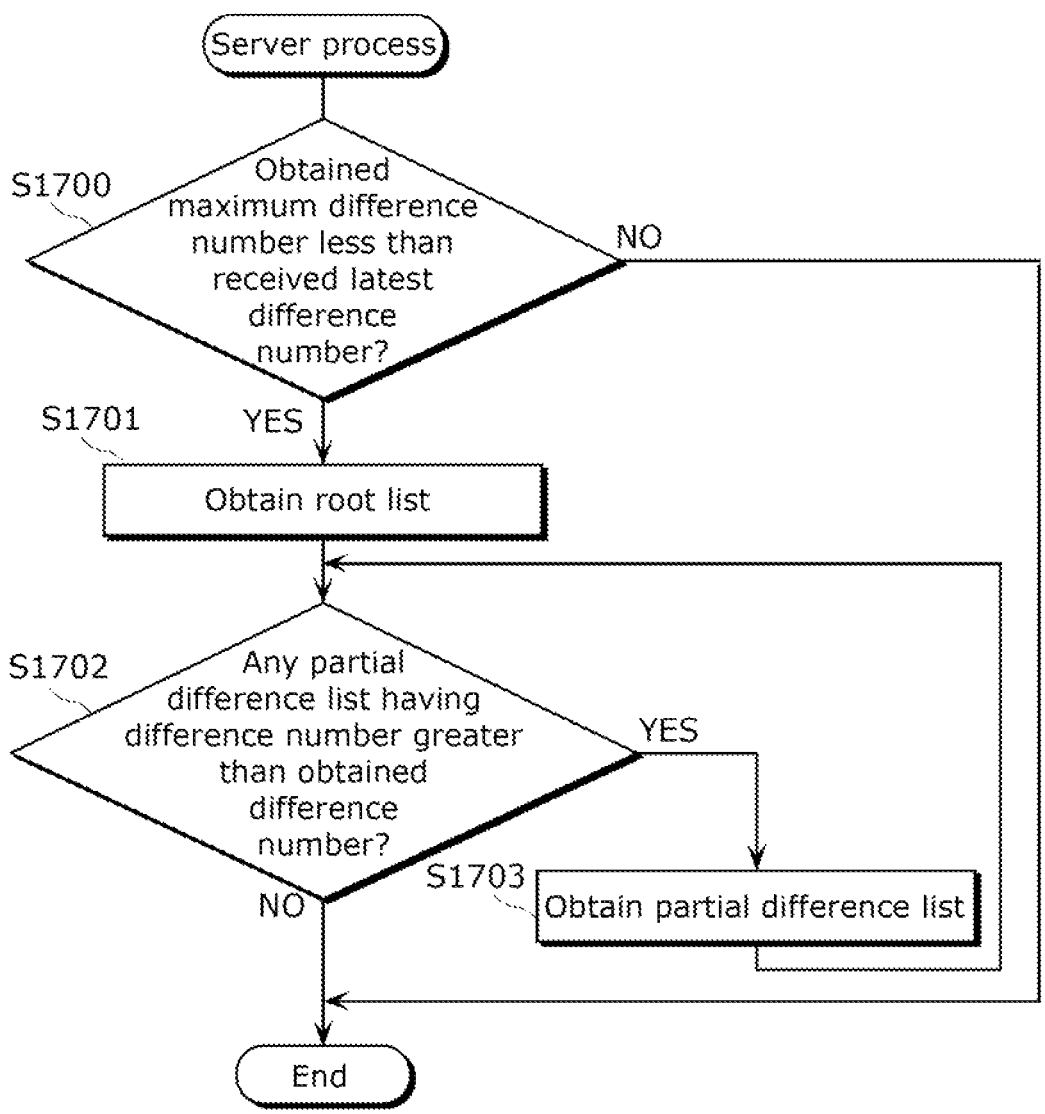
FIG. 18 is a flowchart showing a process flow in which the content obtainment server obtains a partial difference list from the client device in the embodiment of the present invention.

FIG. 18 is a flowchart showing a process flow in which the content obtainment server obtains the partial difference list from the client device in the embodiment of the present invention. FIG. 18 corresponds to the process in Steps S1605 to S1608 in FIG. 17 where the content list obtainment unit 203 obtains the partial difference list.

The process in FIG. 18 is described below. First, the content list obtainment unit 203 reads the maximum difference number (column 2) corresponding to the client ID received in Step S1604, from the obtained maximum difference number management table 450 (FIG. 5).

The content list obtainment unit 203 compares the read maximum difference number with the latest difference number received in Step S1604 (Step S1700, same as Step S1605).

In the case where the read maximum difference number is equal to or greater than the received latest difference number (Step S1700: NO), the content list obtainment unit 203 determines that any content not obtained by the content obtainment server 200 is not stored in the client device 300, and ends the process in FIG. 18. That is, the content obtainment server 200 ends the process of content obtainment from the client device 300, as described earlier with reference to FIG. 17.

In the case where the read maximum difference number is less than the received latest difference number (Step S1700: YES), the content list obtainment unit 203 determines that any content not obtained by the content obtainment server 200 is stored in the client device 300. In this case, the content list obtainment unit 203 obtains the root list 500 from the content management unit 303 (Step S1701).

Next, the content list obtainment unit 203 performs the following operation on a list which is either: the root list 500 obtained in Step S1701; or a difference list (which is a collective term for the difference root list and the partial difference list) obtained in below-mentioned Step S1703, and which includes one or more difference lists. In the operation, the content list obtainment unit 203 compares the maximum difference number read in Step S1700 with difference numbers of all included difference lists (Step S1702).

In the case where the difference numbers of all difference lists are equal to or less than the maximum difference number read in Step S1700 (Step S1702: NO), the content list obtainment unit 203 determines that any content not obtained by the content obtainment server 200 is not stored in the client device 300, and ends the process in FIG. 18.

In the case where at least one of the difference lists has a greater difference number than the maximum difference number read in Step S1700 (Step S1702: YES), the content list obtainment unit 203 determines that information about any content not obtained by the content obtainment server 200 from the client device 300 is included in the difference list. The content list obtainment unit 203 obtains each difference list having a greater difference number than the maximum difference number read in Step S1700 (Step S1703), and executes Step S1702 again on the difference list obtained in Step S1703. Step S1702 is repeatedly executed until there is no more difference list (partial difference list or difference root list including information about any content not obtained by the content obtainment server 200 from the client device 300) having a greater difference number than the maximum difference number read in Step S1700.

For example, consider the case where the content obtainment server 200 obtains the difference list from the client device 300 whose client ID is "CLIENT01" (row 2 in FIG. 5). Suppose the client device 300 whose client ID is "CLIENT01" has the content list of the structure shown in FIG. 6, and the obtained content table 400 (FIG. 4) in the content obtainment server 200 includes the information shown in FIG. 4. Also suppose the client device 300 whose client ID is "CLIENT01" notifies the content obtainment server 200 of "30" as the latest difference number in Step S1604 in FIG. 17.

In this case, the content list obtainment unit 203 executes the process in FIG. 18 as follows. First, the content list obtainment unit 203 reads "8" as the maximum difference number corresponding to the client ID "CLIENT01", from the obtained maximum difference number management table 450 (FIG. 5). The content list obtainment unit 203 compares "8" with "30" which is the received difference number mentioned above (Step S1700). Since the read maximum difference number "8" is less than the received difference number "30" (Step S1700: YES), the content list obtainment unit 203 obtains the root list 500 (Step S1701).

The content list obtainment unit 203 compares the difference number "30" (row 4, column 6 in FIG. 7) of the difference root list 502 (DIFF-ROOT) in the root list 500, with the maximum difference number "8" read in Step S1700 (Step S1702). Since the difference number of the difference root list 502 is greater than the maximum difference number read in Step S1605 (Step S1702: YES), the content list obtainment unit 203 obtains the difference root list 502 (FIG. 9) (Step S1703).

Next, the content list obtainment unit 203 compares each of the difference numbers of the three partial difference lists ("DIFF-LIST01" in row 2 to "DIFF-LIST03" in row 4) in the difference root list 502, with the maximum difference number "8" read in Step S1700 (Step S1702). Since the difference numbers of all partial difference lists are greater than the maximum difference number read in Step S1605 as a result of the comparison (Step S1702: YES), the content list obtainment unit 203 obtains all of the three partial difference lists (Step S1703). Since none of the obtained three partial difference lists has a lower partial difference list, the content list obtainment unit 203 ends the process (Step S1702: NO). It is assumed here that none of the three partial difference lists ("DIFF-LIST01" to "DIFF-LIST03") has a lower partial difference list.

Though the resource path of the difference root list 502 is included in the root list 500 in this example, the resource path may instead be included in the client device information managed by the client device information management unit 301, as mentioned earlier. In such a case, the content list obtainment unit 203 directly obtains the difference root list 502 without obtaining the root list 500. The processing time for the content list obtainment unit 203 to obtain the content list can thus be reduced.

Figure 19:
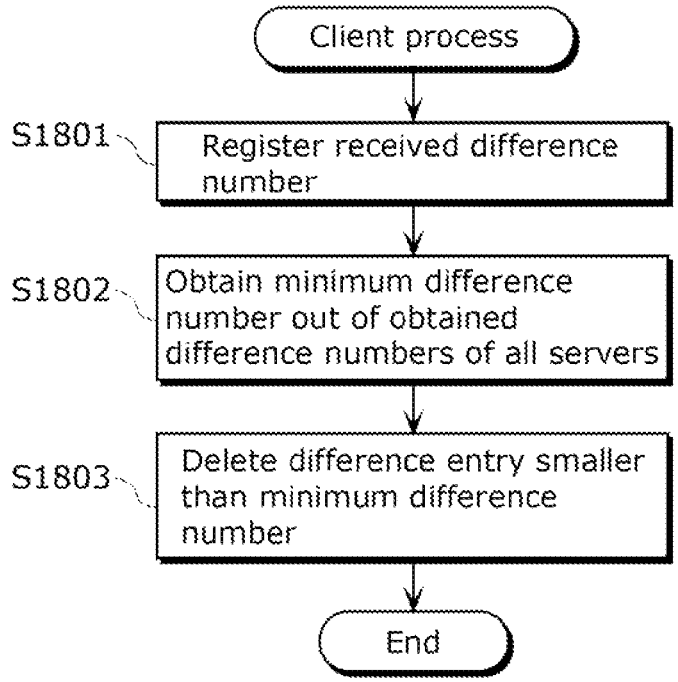
FIG. 19 is a flowchart showing a process flow of the client device upon receiving an obtained latest difference number notification from the content obtainment server in the embodiment of the present invention.

FIG. 19 is a flowchart showing a process flow of the client device upon receiving the obtained latest difference number notification from the content obtainment server in the embodiment of the present invention.

In Step S1512 in FIG. 17, upon receiving the obtained latest difference number notification, the difference list management unit 304 records the received information in the server management table 1100 (FIG. 12), and updates the partial difference list. FIG. 19 corresponds to this process.

The process in FIG. 19 is described below. First, the difference list management unit 304 replaces, in the server management table 1100 (FIG. 12), the obtained latest difference number (column 2) corresponding to the server ID (column 1) of the received obtained latest difference number notification, with the difference number in the received obtained latest difference number notification (Step S1801).

Next, the difference list management unit 304 obtains the minimum difference number out of the obtained latest difference numbers corresponding to all server IDs recorded in the server management table 1100 (Step S1802). The difference list management unit 304 then deletes, from the content table 1000 (FIG. 11), each entry whose type is "difference" and whose difference number is equal to or less than the minimum difference number obtained in Step S1802. All such entries are deleted from the content table 1000 (Step S1803). Since the entry type "difference" indicates difference content information, only difference content information is subjected to the deletion in Step S1803. The difference list management unit 304 also deletes each partial difference list (entry of the type "partial difference list") whose child count becomes "0" as a result of the deletion of each entry of the type "difference".

The minimum difference number selected in Step S1802 is the minimum difference number out of all difference numbers of the following one or more sets of difference content information. The sets of difference content information included in the partial difference list include one or more sets of difference content information obtained by all content obtainment servers 200 registered in the server management table 1100. The selected minimum difference number is the minimum difference number out of all difference numbers of such one or more sets of difference content information obtained by all content obtainment servers 200.

Each set of difference content information whose difference number is equal to or less than the minimum difference number selected in Step S1802 is no longer needed by any content obtainment server 200. Accordingly, each set of difference content information whose difference number is equal to or less than the selected minimum difference number can be deleted from the content table 1000 in Step S1803.

By deleting each set of difference content information no longer needed by any content obtainment server 200, it is possible to keep unnecessary difference content information from being included in the partial difference list. This can reduce the amount of information of the partial difference list obtained by the content obtainment server 200, with it being possible to reduce the processing time in the system.

In Step S1507 in FIG. 16, each time a content state change such as content addition, update, or deletion occurs, the difference list management unit 304 notifies all content obtainment servers 200 of the latest difference number in the client device 300.

Here, the difference list management unit 304 may further perform the following operation. The process in Step S1803 in FIG. 19 is performed to delete, from the difference list, all difference entries associated with difference numbers equal to or less than the minimum difference number out of the obtained latest difference numbers of all content obtainment servers 200. After this deletion, the difference list management unit 304 notifies the content list obtainment unit 203 of the minimum difference number out of the obtained latest difference numbers received from all content obtainment servers 200, together with the client ID of the client device 300. This enables the content list obtainment unit 203 to calculate the number of difference entries currently included in the difference list and estimate, from the calculated number, the time required to obtain the partial difference list and the time required to obtain any unobtained content.

Figure 20:
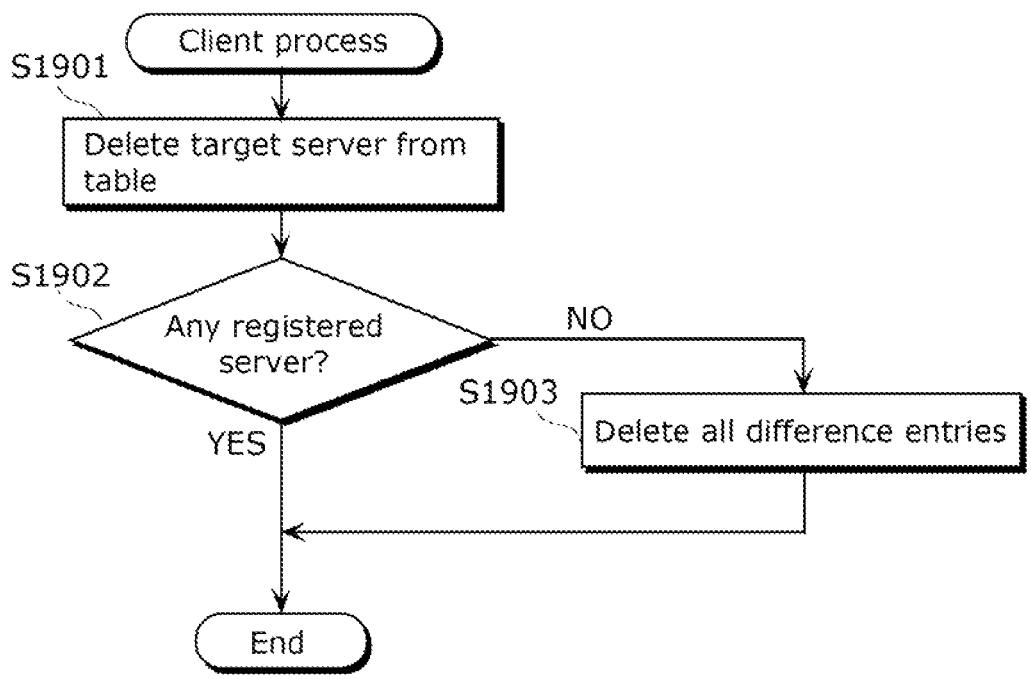
FIG. 20 is a flowchart showing a process flow of the client device upon receiving a server registration cancellation request from the content obtainment server in the embodiment of the present invention.

FIG. 20 is a flowchart showing a process flow of the client device upon receiving a server registration cancellation request from the content obtainment server in the embodiment of the present invention.

In detail, in the case where the server registration application unit 202 in the content obtainment server 200 sends the server registration cancellation request to the client device 300, the client device 300 cancels the registration of the content obtainment server 200.

After sending the server registration request (Step S1503 in FIG. 16), the content obtainment server 200 sends the server registration cancellation request to the client device 300. The content obtainment server 200 can thus request the client device 300 to cancel the registration. The server registration cancellation request is sent according to an instruction by the user or initial settings of the content obtainment server 200. The server registration cancellation request includes the server ID of the content obtainment server 200 whose registration is to be canceled.

The process in FIG. 20 is described below. First, the server management unit 302 deletes an entry having the server ID included in the received server registration cancellation request, from the server management table 1100 (FIG. 12) (Step S1901).

Next, the difference list management unit 304 references to the server management table 1100, to determine whether or not there is at least one registered content obtainment server 200 (Step S1902). In the case where there is at least one registered content obtainment server 200 (Step S1902: YES), the difference list management unit 304 ends the process. In the case where there is no registered content obtainment server 200 (step S1902: NO), the difference list management unit 304 deletes all difference content information (entry of the type "difference") and difference list (entry of the type "difference root list" or "partial difference list"), from the content table 1000 (Step S1903).

In the case where there is no more entry of any content obtainment server 200 in the server management table 1100 as a result of deletion, the partial difference list is not needed by any content obtainment server 200, that is, there is no content obtainment server 200 that needs the partial difference list. Accordingly, in the case where there is no more entry of any content obtainment server 200 in the server management table 1100 as a result of the server registration cancellation request, the client device 300 can delete the difference content information and the difference list (difference root list and partial difference list) from the content table 1000. By deleting the unnecessary difference content information and difference list in this way, the storage area consumption of the client device 300 can be reduced. Subsequently, the client device 300 does not record difference content information in the content table 1000, unless any content obtainment server 200 is recorded in the server management table 1100 according to the server registration request. Thus, the unnecessary difference content information is kept from being included in the content table 1000. This can reduce the processing load on the client device 300.

FIG. 20 shows an example where the client device 300 cancels the registration of the content obtainment server 200 in the case where the server registration application unit 202 in the content obtainment server 200 sends the server registration cancellation request to the client device 300. As an alternative, the user may designate a content obtainment server 200 whose registration is to be canceled, by operating an input unit (not shown) included in the client device 300. For example, in a digital camera and the like, a list of registered content obtainment servers 200 may be displayed in a menu screen or the like displayed on a liquid crystal panel. The user may select a content obtainment server 200 from the list of registered content obtainment servers 200 using up and down arrow keys so that the registration of the content obtainment server 200 selected by the user is canceled.

The functional blocks in the block diagrams (such as FIGS. 2 and 3) are typically realized as LSI which is an integrated circuit. These functional blocks may each be individually implemented as one chip, or may be partly or wholly implemented on one chip.

For example, the functional blocks other than the memory may be implemented on one chip.

Though LSI is mentioned here, the circuit may be called. IC, system LSI, super LSI, ultra LSI, or the like, depending on the degree of integration.

The integrated circuit method is not limited to LSI, and may be realized by a dedicated circuit or a general-purpose processor. An FPGA (Field Programmable Gate Array) that can be programmed after LSI manufacturing or a reconfigurable processor capable of reconfiguring connections and settings of circuit cells in LSI may also be used.

When an integrated circuit technology that replaces LSI emerges from the development of semiconductor technologies or other derivative technologies, such a technology may be used for the integration of the functional blocks. For instance, biotechnology may be adapted in this way.

Of the above-mentioned functional blocks, the content storage unit alone may be provided as a separate structure without being implemented on one chip together with the other functional blocks.

Though the embodiment of the present invention has been described with reference to the drawings, the present invention is not limited to the illustrated embodiment. Various modifications and changes can be made to the illustrated embodiment within the same or equivalent scope of the present invention.

In the above embodiment, each component may be realized by dedicated hardware or execution of a suitable software program. Each component may also be realized by a program execution unit such as a CPU or a processor reading and executing a software program recorded on a recording medium such as a hard disk or a semiconductor memory. Software for implementing the client device and the like in the above embodiment is the following program.

As an example, the program is a program recorded on a non-transitory computer-readable recording medium for use in a computer, for a client device in a content obtainment system in which one or more server apparatuses obtain a plurality of contents stored in a storage unit in the client device, the program causing the computer to operate as: a content management unit that causes the one or more server apparatuses to obtain the stored contents; a difference information management unit that generates difference information as information common to the one or more server apparatuses, and provides the difference information in response to a request of each of the one or more server apparatuses, the difference information including content information about a content not obtained by all of the one or more server apparatuses from the client device from among the stored contents; and an obtained content management unit that receives, from each of the one or more server apparatuses, obtained content information which is content information about a content obtained by the server apparatus, wherein the difference information management unit deletes, from the difference information, content information about a content obtained by all of the one or more server apparatuses, based on the received obtained content information.

As another example, the program is a program recorded on a non-transitory computer-readable recording medium for use in a computer, for a server apparatus in a content obtainment system in which one or more server apparatuses obtain a plurality of contents stored in a client device, the program causing the computer to operate as: a difference information obtainment unit that obtains difference information from the client device, the difference information including content information about a content stored in the client device and not obtained by all of the one or more server apparatuses from the client device; a content obtainment unit that obtains only an unobtained content from the client device, based on the content information included in the difference information, and an obtained content management unit that records content information about the content obtained by the content obtainment unit, wherein the difference information includes the content information on a content-by-content basis, in association with a difference number indicating, by a magnitude relation thereof, time series of state change including content addition, update, or deletion, the obtained content management unit records a maximum difference number out of all difference numbers associated with the content information about the content obtained by the content obtainment unit, as a first difference number, the content obtainment unit obtains, from the client device, only a content corresponding to content information associated with a difference number greater than the first difference number in the difference information, and the program further causes the computer to operate as an obtained content notification unit that notifies the client device of a server identifier and the first difference number, the server identifier being an identifier of the server apparatus.

INDUSTRIAL APPLICABILITY

In the content obtainment system according to the present invention, the client device only needs to manage one type of content list for the plurality of content obtainment servers. The client device receives, from each content obtainment server, information about a content obtained by the content obtainment server from the client device. The client device then deletes information about each content obtained by all content obtainment servers, from the content list. By doing so, unnecessary information in the content list can be reduced. Thus, the client device can generate the content list with a lighter processing load than in the method using the individual content list. Furthermore, the content obtainment server can obtain the content list with less unnecessary information from the client device than in the method using the full content list. This can reduce the time to obtain the content list from the client device and the time to specify any unobtained content from the content list. Therefore, the content obtainment system according to the present invention is useful as, for example, a content obtainment system in which a server apparatus obtains contents stored in a client device and manages the contents in a centralized manner.

REFERENCE SIGNS LIST

100 Display
200 Content obtainment server
201 Client device information obtainment unit
202 Server registration application unit
203 Content list obtainment unit
204 Content obtainment unit
205 Obtained content application unit
206 Communication control unit
207 Display control unit
208, 306 Storage unit
300 Client device
301 Client device information management unit
302 Server management unit
303 Content management unit
304 Difference list management unit
305 Communication control unit
400 Obtained content table
450 Obtained maximum difference number management table
500 Root list
501 Image list
502 Difference root list
503 Partial difference list
1000 Content table
1100 Server management table
1200 Difference number management table

The invention claimed is:

1. A client device in a content obtainment system in which one or more server apparatuses obtain a plurality of contents stored in the client device, the client device comprising:
    a storage unit configured to store the plurality of contents;
    a content management unit configured to cause the one or more server apparatuses to obtain the stored contents;
    a difference information management unit configured to generate difference information as information common to the one or more server apparatuses, and provide the difference information in response to a request of each of the one or more server apparatuses, the difference information including content information about a content not obtained by all of the one or more server apparatuses from the client device from among the stored contents;
    an obtained content management unit configured to receive, from each of the one or more server apparatuses, obtained content information which is content information about a content obtained by the server apparatus; and
    a server management unit configured to store one or more server identifiers for identifying the one or more server apparatuses,
    wherein the difference information management unit is configured to delete, from the difference information, content information about a content obtained by all of the one or more server apparatuses, based on the received obtained content information; and, in the case where a new content is added to the contents stored in the storage unit or a content stored in the storage unit is updated or deleted, include content information about the added, updated, or deleted content in the difference information as new content information,
    the obtained content management unit is configured to receive, from the server apparatus, a server identifier of the server apparatus and the obtained content information, and record the received server identifier and obtained content information in association with each other,
    the difference information management unit is configured to delete, from the difference information, content information indicated by obtained content information associated with all server identifiers stored in the server management unit from among all obtained content information recorded by the obtained content management unit,
    the difference information management unit is configured to: manage a difference number indicating, by a magnitude relation thereof, time series of state change including content addition, update, or deletion, in association with content information about a content not obtained by all of the one or more server apparatuses from the client device; and, each time the state change that the new content is added to the client device or the stored content is updated or deleted occurs, increase the difference number and associate the increased difference number with the content information about the content having the state change,
    the obtained content management unit is configured to receive, from the server apparatus, a maximum difference number out of all difference numbers associated with the obtained content information,
    the server management unit is configured to manage a server management table in which the received server identifier and maximum difference number are associated with each other, and
    the difference information management unit is configured to select a minimum difference number out of difference numbers associated with all server identifiers stored in the server management unit, and delete, from the difference information, content information associated with a difference number equal to or less than the minimum difference number.

2. The client device according to claim 1,
wherein the difference information management unit is configured to, in the case where the new content is added to the client device or the stored content is updated or deleted, include the content information about the added, updated, or deleted content in the difference information, and then notify all server apparatuses whose server identifiers are stored in the server management unit that the difference information is updated.

3. The client device according to claim 2,
wherein the difference information management unit is further configured to, after including the content information about the added, updated, or deleted content in the difference information, notify all server apparatuses whose server identifiers are stored in the server management unit of a total number of sets of content information included in the difference information.

4. The client device according to claim 1,
wherein the difference information management unit is configured to, after including the content information about the content having the state change in the difference information, notify all server apparatuses whose server identifiers are stored in the server management unit of a maximum difference number out of all difference numbers included in the difference information.

5. The client device according to claim 4,
wherein the difference information management unit is configured to, after including the content information about the content having the state change in the difference information, notify all server apparatuses whose server identifiers are stored in the server management unit of a minimum difference number out of all difference numbers included in the difference information.

6. The client device according to claim 1,
wherein the difference information management unit is configured to:
(1) include the content information associated with the difference number in first difference information, and include, in second difference information in a higher hierarchical level than the first difference information, a maximum difference number out of all difference numbers included in the first difference information and information about the first difference information in association with each other;
(2) in the case where the number of sets of content information included in the first difference information reaches a predetermined number, newly generate third difference information in the same hierarchical level as the first difference information, include, in the third difference information, the content information which causes the predetermined number to be exceeded in the case of being included in the first difference information, and include, in the second difference information, a maximum difference number out of all difference numbers included in the third difference information and information about the third difference information in association with each other; and
provide the first difference information or provide the second difference information and at least one of the first difference information and the third difference information, in response to a request of the server apparatus.

7. The client device according to claim 1,
wherein the difference information management unit is configured to include the content information in the difference information, only in the case where a server identifier of any of the one or more server apparatuses is stored in the server management unit.

8. The client device according to claim 1,
wherein the server management unit is configured to delete a designated server identifier out of the stored server identifiers, and
the difference information management unit is configured to delete all content information included in the difference information and the difference information, in the case where no server identifier is stored in the server management unit.

9. The client device according to claim 1,
wherein the server management unit is configured to receive a server registration request including the server identifier from the server apparatus, and store the received server identifier.

10. The client device according to claim 1, further comprising
a device information provision unit configured to provide client device information including information about the client device to the server apparatus, the information about the client device including a client identifier of the client device,
wherein the device information provision unit is configured to include information for obtaining the difference information, in the client device information.

11. A server apparatus in a content obtainment system in which one or more server apparatuses obtain a plurality of contents stored in a client device, the server apparatus comprising:
a difference information obtainment unit configured to obtain difference information from the client device, the difference information including content information about a content stored in the client device and not obtained by all of the one or more server apparatuses from the client device;
a content obtainment unit configured to obtain only an unobtained content from the client device, based on the content information included in the difference information; and
an obtained content management unit configured to record content information about the content obtained by the content obtainment unit,
wherein the difference information includes the content information about the content stored in the client device on a content-by-content basis, in association with a difference number indicating, by a magnitude relation thereof, time series of state change including content addition, update, or deletion,
the obtained content management unit is configured to record a maximum difference number out of all difference numbers associated with the content information about the content obtained by the content obtainment unit, as a first difference number,
the content obtainment unit is configured to obtain, from the client device, only a content corresponding to content information associated with a difference number greater than the first difference number in the difference information,
the difference information obtainment unit is configured to, in the case where first difference information obtained from the client device includes information about second difference information in a lower hierarchical level than the first difference information: obtain a difference number associated with content information included in the second difference information, from the information about the second difference information; compare the obtained difference number with the first difference number; and obtain the second difference information only in the case where the difference number associated with the content information included in the second difference information is greater than the first difference number, and
the server apparatus further comprises
an obtained content notification unit configured to notify the client device of a server identifier and the first difference number, the server identifier being an identifier of the server apparatus.

12. The server apparatus according to claim 11, further comprising
a difference number reception unit configured to receive a latest difference number from the client device,
wherein the difference information obtainment unit is configured to compare the latest difference number received by the difference number reception unit with the first difference number, and obtain the difference information from the client device only in the case where the latest difference number received by the difference number reception unit is greater than the first difference number.

13. The server apparatus according to claim 11, further comprising a device information obtainment unit configured to obtain client device information including a client identifier, the client device information including information for obtaining the difference information from the client device, wherein the difference information obtainment unit is configured to obtain the difference information based on the information included in the client device information.

14. A content obtainment method used by a client device in a content obtainment system in which one or more server apparatuses obtain a plurality of contents stored in the client device, the client device including a storage unit configured to store the plurality of contents, the content obtainment method comprising:

causing the one or more server apparatuses to obtain the stored contents;

generating difference information as information common to the one or more server apparatuses, and providing the difference information in response to a request of each of the one or more server apparatuses, the difference information including content information about a content not obtained by all of the one or more server apparatuses from the client device from among the stored contents;

receiving, from each of the one or more server apparatuses, obtained content information which is content information about a content obtained by the server apparatus;

storing one or more server identifiers for identifying the one or more server apparatuses;

deleting, from the difference information, content information about a content obtained by all of the one or more server apparatuses, based on the received obtained content information; and, in the case where a new content is added to the contents stored in the storage unit or a content stored in the storage unit is updated or deleted, including content information about the added, updated, or deleted content in the difference information as new content information;

receiving, from the server apparatus, a server identifier of the server apparatus and the obtained content information, and recording the received server identifier and obtained content information in association with each other;

deleting, from the difference information, content information indicated by obtained content information associated with all stored server identifiers from among all recorded obtained content information;

managing a difference number indicating, by a magnitude relation thereof, time series of state change including content addition, update, or deletion, in association with content information about a content not obtained by all of the one or more server apparatuses from the client device; and, each time the state change that the new content is added to the client device or the stored content is updated or deleted occurs, increasing the difference number and associating the increased difference number with the content information about the content having the state change;

receiving, from the server apparatus, a maximum difference number out of all difference numbers associated with the obtained content information;

managing a server management table in which the received server identifier and maximum difference number are associated with each other; and selecting a minimum difference number out of difference numbers associated with all stored server identifiers, and deleting, from the difference information, content information associated with a difference number equal to or less than the minimum difference number.

15. A content obtainment method used by a server apparatus in a content obtainment system in which one or more server apparatuses obtain a plurality of contents stored in a client device, the content obtainment method comprising:

obtaining difference information from the client device, the difference information including content information about a content stored in the client device and not obtained by all of the one or more server apparatuses from the client device;

obtaining only an unobtained content from the client device, based on the content information included in the difference information; and recording content information about the obtained content, wherein the difference information includes the content information about the content stored in the client device on a content-by-content basis, in association with a difference number indicating, by a magnitude relation thereof, time series of state change including content addition, update, or deletion, the recording includes recording a maximum difference number out of all difference numbers associated with the content information about the obtained content, as a first difference number, the obtaining only an unobtained content includes obtaining, from the client device, only a content corresponding to content information associated with a difference number greater than the first difference number in the difference information, obtaining, in the case where first difference information obtained from the client device includes information about second difference information in a lower hierarchical level than the first difference information: a difference number associated with content information included in the second difference information, from the information about the second difference information; comparing the obtained difference number with the first difference number; and obtaining the second difference information only in the case where the difference number associated with the content information included in the second difference information is greater than the first difference number, and the content obtainment method further comprises notifying the client device of a server identifier and the first difference number, the server identifier being an identifier of the server apparatus.

16. A non-transitory computer-readable medium having a program recorded thereon for use in a computer, for a client device in a content obtainment system in which one or more server apparatuses obtain a plurality of contents stored in a storage unit in the client device, the program causing the computer to operate as:

a content management unit configured to cause the one or more server apparatuses to obtain the stored contents;

a difference information management unit configured to generate difference information as information common to the one or more server apparatuses, and provide the difference information in response to a request of each of the one or more server apparatuses, the difference information including content information about a content not obtained by all of the one or more server apparatuses from the client device from among the stored contents;

an obtained content management unit configured to receive, from each of the one or more server apparatuses, obtained content information which is content information about a content obtained by the server apparatus; and a server management unit configured to store one or more server identifiers for identifying the one or more server apparatuses, wherein the difference information management unit is configured to delete, from the difference information, content information about a content obtained by all of the one or more server apparatuses, based on the received obtained content information; and, in the case where a new content is added to the contents stored in the storage unit or a content stored in the storage unit is updated or deleted, include content information about the added, updated, or deleted content in the difference information as new content information, the obtained content management unit is configured to receive, from the server apparatus, a server identifier of the server apparatus and the obtained content information, and record the received server identifier and obtained content information in association with each other, the difference information management unit is configured to delete, from the difference information, content information indicated by obtained content information associated with all server identifiers stored in the server management unit from among all obtained content information recorded by the obtained content management unit, the difference information management unit is configured to: manage a difference number indicating, by a magnitude relation thereof, time series of state change including content addition, update, or deletion, in association with content information about a content not obtained by all of the one or more server apparatuses from the client device; and, each time the state change that the new content is added to the client device or the stored content is updated or deleted occurs, increase the difference number and associate the increased difference number with the content information about the content having the state change, the obtained content management unit is configured to receive, from the server apparatus, a maximum difference number out of all difference numbers associated with the obtained content information, the server management unit is configured to manage a server management table in which the received server identifier and maximum difference number are associated with each other, and the difference information management unit is configured to select a minimum difference number out of difference numbers associated with all server identifiers stored in the server management unit, and delete, from the difference information, content information associated with a difference number equal to or less than the minimum difference number.

17. A non-transitory computer-readable medium having a program recorded thereon for use in a computer, for a server apparatus in a content obtainment system in which one or more server apparatuses obtain a plurality of contents stored in a client device, the program causing the computer to operate as:

a difference information obtainment unit configured to obtain difference information from the client device, the difference information including content information about a content stored in the client device and not obtained by all of the one or more server apparatuses from the client device;

a content obtainment unit configured to obtain only an unobtained content from the client device, based on the content information included in the difference information; and an obtained content management unit configured to record content information about the content obtained by the content obtainment unit, wherein the difference information includes the content information about the content stored in the client device on a content-by-content basis, in association with a difference number indicating, by a magnitude relation thereof, time series of state change including content addition, update, or deletion, the obtained content management unit is configured to record a maximum difference number out of all difference numbers associated with the content information about the content obtained by the content obtainment unit, as a first difference number, the content obtainment unit is configured to obtain, from the client device, only a content corresponding to content information associated with a difference number greater than the first difference number in the difference information, the difference information obtainment unit is configured to, in the case where first difference information obtained from the client device includes information about second difference information in a lower hierarchical level than the first difference information: obtain a difference number associated with content information included in the second difference information, from the information about the second difference information; compare the obtained difference number with the first difference number; and obtain the second difference information only in the case where the difference number associated with the content information included in the second difference information is greater than the first difference number, and the program further causing the computer to operate as an obtained content notification unit configured to notify the client device of a server identifier and the first difference number, the server identifier being an identifier of the server apparatus.

18. An integrated circuit implementing a client device in a content obtainment system in which one or more server apparatuses obtain a plurality of contents stored in the client device, the integrated circuit comprising:

a storage unit configured to store the plurality of contents;

a content management unit configured to cause the one or more server apparatuses to obtain the stored contents;

a difference information management unit configured to generate difference information as information common to the one or more server apparatuses, and provide the difference information in response to a request of each of the one or more server apparatuses, the difference information including content information about a content not obtained by all of the one or more server apparatuses from the client device from among the stored contents;

an obtained content management unit configured to receive, from each of the one or more server apparatuses, obtained content information which is content information about a content obtained by the server apparatus; and a server management unit configured to store one or more server identifiers for identifying the one or more server apparatuses, wherein the difference information management unit is configured to delete, from the difference information, content information about a content obtained by all of the one or more server apparatuses, based on the received obtained content information; and, in the case where a new content is added to the contents stored in the storage unit or a content stored in the storage unit is updated or deleted, include content information about the added, updated, or deleted content in the difference information as new content information, the obtained content management unit is configured to receive, from the server apparatus, a server identifier of the server apparatus and the obtained content information, and record the received server identifier and obtained content information in association with each other, the difference information management unit is configured to delete, from the difference information, content information indicated by obtained content information associated with all server identifiers stored in the server management unit from among all obtained content information recorded by the obtained content management unit, the difference information management unit is configured to: manage a difference number indicating, by a magnitude relation thereof, time series of state change including content addition, update, or deletion, in association with content information about a content not obtained by all of the one or more server apparatuses from the client device; and, each time the state change that the new content is added to the client device or the stored content is updated or deleted occurs, increase the difference number and associate the increased difference number with the content information about the content having the state change, the obtained content management unit is configured to receive, from the server apparatus, a maximum difference number out of all difference numbers associated with the obtained content information, the server management unit is configured to manage a server management table in which the received server identifier and maximum difference number are associated with each other, and the difference information management unit is configured to select a minimum difference number out of difference numbers associated with all server identifiers stored in the server management unit, and delete, from the difference information, content information associated with a difference number equal to or less than the minimum difference number.

19. An integrated circuit implementing a server apparatus in a content obtainment system in which one or more server apparatuses obtain a plurality of contents stored in a client device, the integrated circuit comprising:

a difference information obtainment unit configured to obtain difference information from the client device, the difference information including content information about a content stored in the client device and not obtained by all of the one or more server apparatuses from the client device;

a content obtainment unit configured to obtain only an unobtained content from the client device, based on the content information included in the difference information; and an obtained content management unit configured to record content information about the content obtained by the content obtainment unit, wherein the difference information includes the content information about the content stored in the client device on a content-by-content basis, in association with a difference number indicating, by a magnitude relation thereof, time series of state change including content addition, update, or deletion, the obtained content management unit is configured to record a maximum difference number out of all difference numbers associated with the content information about the content obtained by the content obtainment unit, as a first difference number, the content obtainment unit is configured to obtain, from the client device, only a content corresponding to content information associated with a difference number greater than the first difference number in the difference information, the difference information obtainment unit is configured to, in the case where first difference information obtained from the client device includes information about second difference information in a lower hierarchical level than the first difference information: obtain a difference number associated with content information included in the second difference information, from the information about the second difference information; compare the obtained difference number with the first difference number; and obtain the second difference information only in the case where the difference number associated with the content information included in the second difference information is greater than the first difference number, and the server apparatus further comprises an obtained content notification unit configured to notify the client device of a server identifier and the first difference number, the server identifier being an identifier of the server apparatus.

* * * * *